United States Patent
Karczewicz et al.

(10) Patent No.: US 10,623,737 B2
(45) Date of Patent: Apr. 14, 2020

(54) PEAK SAMPLE ADAPTIVE OFFSET

(71) Applicant: QUALCOMM Incorporated, San Diego, CA (US)

(72) Inventors: Marta Karczewicz, San Diego, CA (US); Li Zhang, San Diego, CA (US); Jianle Chen, San Diego, CA (US); Wei-Jung Chien, San Diego, CA (US); Yi-Wen Chen, San Diego, CA (US); Xin Zhao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 79 days.

(21) Appl. No.: 15/724,112

(22) Filed: Oct. 3, 2017

(65) Prior Publication Data
US 2018/0098065 A1    Apr. 5, 2018

Related U.S. Application Data
(60) Provisional application No. 62/404,126, filed on Oct. 4, 2016.

(51) Int. Cl.
*H04N 19/00*     (2014.01)
*H04N 19/117*    (2014.01)
(Continued)

(52) U.S. Cl.
CPC ......... *H04N 19/117* (2014.11); *H04N 19/132* (2014.11); *H04N 19/137* (2014.11);
(Continued)

(58) Field of Classification Search
CPC .. H04N 19/117; H04N 19/132; H04N 19/137; H04N 19/14; H04N 19/147;
(Continued)

(56) References Cited

U.S. PATENT DOCUMENTS

| | | | |
|---|---|---|---|
| 2013/0177067 A1* | 7/2013 | Minoo | H04N 19/176 375/240.02 |
| 2017/0237981 A1 | 8/2017 | Karczewicz et al. | |

(Continued)

FOREIGN PATENT DOCUMENTS

EP    2903282 A1    8/2015

OTHER PUBLICATIONS

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

(Continued)

*Primary Examiner* — Frank F Huang
(74) *Attorney, Agent, or Firm* — Shumaker & Sieffert, P.A.

(57) ABSTRACT

A video coder compares a first sample of a current block to a first set of neighbor samples to determine a first difference value; determines a first offset for the first sample based on the first difference value; compares a second sample of the current block to a second set of neighbor samples to determine a second difference value that has a same sign as the first difference value; determines an offset for the second sample, that is different than the offset for the first sample, based on the second difference value; and applies the first offset to the first sample value and the second offset to the second sample value to generate a filtered image.

36 Claims, 9 Drawing Sheets

(51) Int. Cl.

| | |
|---|---|
| H04N 19/137 | (2014.01) |
| H04N 19/132 | (2014.01) |
| H04N 19/96 | (2014.01) |
| H04N 19/80 | (2014.01) |
| H04N 19/44 | (2014.01) |
| H04N 19/70 | (2014.01) |
| H04N 19/159 | (2014.01) |
| H04N 19/174 | (2014.01) |
| H04N 19/147 | (2014.01) |
| H04N 19/82 | (2014.01) |
| H04N 19/14 | (2014.01) |
| H04N 19/182 | (2014.01) |
| H04N 19/176 | (2014.01) |

(52) U.S. Cl.
CPC ........... *H04N 19/14* (2014.11); *H04N 19/147* (2014.11); *H04N 19/159* (2014.11); *H04N 19/174* (2014.11); *H04N 19/176* (2014.11); *H04N 19/182* (2014.11); *H04N 19/44* (2014.11); *H04N 19/70* (2014.11); *H04N 19/80* (2014.11); *H04N 19/82* (2014.11); *H04N 19/96* (2014.11)

(58) Field of Classification Search
CPC .... H04N 19/159; H04N 19/17; H04N 19/176; H04N 19/182; H04N 19/44; H04N 19/70; H04N 19/80; H04N 19/82; H04N 19/96
See application file for complete search history.

(56) References Cited

U.S. PATENT DOCUMENTS

2017/0237982 A1   8/2017   Karczewicz et al.
2017/0238020 A1   8/2017   Karczewicz et al.

OTHER PUBLICATIONS

Chen J., et al., "Algorithm Description of Joint Exploration Test Model 2," Joint Video Exploration Team (JVET) of ITU-T SG 16 WP 3 and ISO/IEC JTC 1/SC 29/WG 11, 2nd Meeting, Document No. JVET-B1001_v1, Feb. 20-26, 2016, 31 pp.

Chen J., et al., "Algorithm Description of Joint Exploration Test Model 3," Document: JVET-C1001_v3, Joint Video Exploration Team (JVET) of ITU-T SG 16 WP 3 and ISO/IEC JTC 1/SC 29/WG 11, 3rd Meeting: Geneva, CH, May 26-Jun. 1, 2016, 37 Pages.

ITU-T H.223, Series H: Audiovisual and Multimedia Systems "Multiplexing Protocol for Low Bit Rate Multimedia Communication," Jul. 2001, 74 pages.

Fu, et al., "Sample Adaptive Offset for HEVC," 2011 IEEE 13th International Workshop on Multimedia Signal Processing, Oct. 2011, 5 pp.

Norkin A., et al., "HEVC Deblocking Filter," IEEE Transactions on Circuits and Systems for Video Technology, vol. 22, No. 12, Dec. 1, 2012 (Dec. 1, 2012), pp. 1746-1754, XP011487156, ISSN: 1051-8215, DOI: 10.1109/TCSVT.2012.2223053 abstract sections II-IV.

Karczewicz M., et al., "Improvements on Adaptive Loop Filter," 2. JVET Meeting, Feb. 20-26, 2016, San Diego, (The Joint Video Exploration Team of ISO/IEC JTC1/SC29/WG11 and ITU-T SG.16), No. JVET-B0060-v2, Feb. 20, 2016 (Feb. 20, 2016), XP030150068, URL: http://PHENIX.INT-EVRY.FR/JVET/, 6 pages.

Karczewicz M., et al., "EE2.5: Improvements on adaptive loop filter," Joint Video Exploration Team (JVET) of ITU-T SG 16 WP 3 and ISO/IEC JTC 1/SC 29/WG 11, 3rd Meeting: Geneva, CH, Document: JVET-C0038, May 26-Jun. 1, 2016, pp. 1-4.

Wang Y-K. et al., "High Efficiency Video Coding (HEVC) Defect Report," Joint Collaborative Team on Video Coding (JCT-VC) OF ITU-T SG 16 WP 3 and ISO/IEC JTC 1/SC 29/WG 11, Doc. JCTVC-N1003_v1, 14th Meeting, Vienna, AT, Jul. 25-Aug. 2, 2013, 311 pages.

Bross et al., "High efficiency video coding (HEVC) text specification draft 10 (for FDIS & Last Call)," 12th Meeting: Geneva, CH, Jan. 14-23, 2013, (Joint Collaborative Team on Video Coding of ISO/IEC JTC1/SC29/WG11 and ITU-T SG.16); JCTVC-L1003_v34, Mar. 19, 2013, 310 pp.

Fu C-M., et al., "Sample Adaptive Offset in the HEVC Standard," IEEE Transactions on Circuits and Systems for Video Technology, Institute of Electrical and Electronics Engineers, USA, Dec. 1, 2012, vol. 22, No. 12, pp. 1755-1764, XP011487153, ISSN: 1051-8215, DOI:10.1109/TCSVT.2012.2221529.

International Search Report and Written Opinion—PCT/US2017/055173—ISA/EPO—Mar. 1, 2018.

Karczewicz M., et al., "Peak Sample Adaptive Offset," 4th JVET Meeting; Oct. 15-21, 2016; Chengdu; (The Joint Video Exploration Team of ISO/IEC JTC1/SC29/WG11 and ITU-T SG.16); URL: http://phenix.int-evry.fr/jvet/, No. JVET-D0133-v3, Oct. 17, 2016, XP030150391, 3 pages.

Onno P., et al., "Modified Sample Adaptive Offset Filtering as an Inter-Layer Processing for Scalable HEVC," 2014 IEEE International Conference on Image Processing (ICIP), IEEE, Oct. 27, 2014, pp. 3720-3723, XP032967323, DOI: 10.1109/ICIP.2014.7025755, [retrieved on Jan. 28, 2015].

Partial International Search Report—PCT/US2017/055173—ISA/EPO—Jan. 2, 2018.

International Preliminary Report on Patentability—PCT/US2017/055173—ISA/EPO—Apr. 18, 2019 14 pgs.

\* cited by examiner

| 95 | 93 | 91 |
|----|----|----|
| 90 | 93 | 91 |
| 90 | 91 | 92 |

FIG. 6B

| 53 | 53 | 47 |
|----|----|----|
| 52 | 50 | 48 |
| 52 | 51 | 52 |

FIG. 6A

PEAK SAMPLE ADAPTIVE OFFSET

This Application claims the benefit of U.S. Provisional Patent Application No. 62/404,126, filed 4 Oct. 2016, the entire content of which is hereby incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the recently finalized High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

This disclosure describes a type of sample adaptive offset (SAO) filtering, referred to herein as peak SAO. A video coder implementing peak SAO, as described in this disclosure, may determine an offset for a sample by comparing the value of the sample to more than two neighboring samples. In some examples, a video coder implementing peak SAO may determine different offsets for different samples of a block based on the magnitude of the difference between the samples and respective neighbor samples.

In one example, a method for decoding video data includes comparing a first sample of a current block to a first set of neighbor samples to determine a first difference value; determining a first offset for the first sample based on the first difference value, wherein the first offset is a first non-zero value; comparing a second sample of the current block to a second set of neighbor samples to determine a second difference value, wherein the first set of neighbor samples has a same pattern relative to the first sample as the second set of neighbor samples has relative to the second sample, and wherein the first difference value and the second difference value have a same sign; determining a second offset for the second sample based on the second difference value, wherein the second offset is a second non-zero value that is different than the first non-zero value; and applying the first offset to the first sample value and the second offset to the second sample value to generate a filtered image.

In another example, a device for decoding video data includes a memory configured to store the video data and one or more processors configured to compare a first sample of a current block to a first set of neighbor samples to determine a first difference value; determine a first offset for the first sample based on the first difference value, wherein the first offset is a first non-zero value; compare a second sample of the current block to a second set of neighbor samples to determine a second difference value, wherein the first set of neighbor samples has a same pattern relative to the first sample as the second set of neighbor samples has relative to the second sample, and wherein the first difference value and the second difference value have a same sign; determine a second offset for the second sample based on the second difference value, wherein the second offset is a second non-zero value that is different than the first non-zero value; and apply the first offset to the first sample value and the second offset to the second sample value to generate a filtered image.

In another example, a computer readable medium stores instructions that when executed by one or more processors cause the one or more processors to compare a first sample of a current block to a first set of neighbor samples to determine a first difference value; determine a first offset for the first sample based on the first difference value, wherein the first offset is a first non-zero value; compare a second sample of the current block to a second set of neighbor samples to determine a second difference value, wherein the first set of neighbor samples has a same pattern relative to the first sample as the second set of neighbor samples has relative to the second sample, and wherein the first difference value and the second difference value have a same sign; determine a second offset for the second sample based on the second difference value, wherein the second offset is a second non-zero value that is different than the first non-zero value; and apply the first offset to the first sample value and the second offset to the second sample value to generate a filtered image.

In another example, an apparatus for decoding video data includes means for comparing a first sample of a current block to a first set of neighbor samples to determine a first difference value; means for determining a first offset for the first sample based on the first difference value, wherein the first offset is a first non-zero value; means for comparing a second sample of the current block to a second set of neighbor samples to determine a second difference value, wherein the first set of neighbor samples has a same pattern relative to the first sample as the second set of neighbor samples has relative to the second sample, and wherein the first difference value and the second difference value have a same sign; means for determining a second offset for the second sample based on the second difference value, wherein the second offset is a second non-zero value that is different than the first non-zero value; and means for applying the first offset to the first sample value and the second offset to the second sample value to generate a filtered image.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

FIGS. 6A and 6B show examples of two samples with 8-selected neighboring samples.

DETAILED DESCRIPTION

Figure 1:
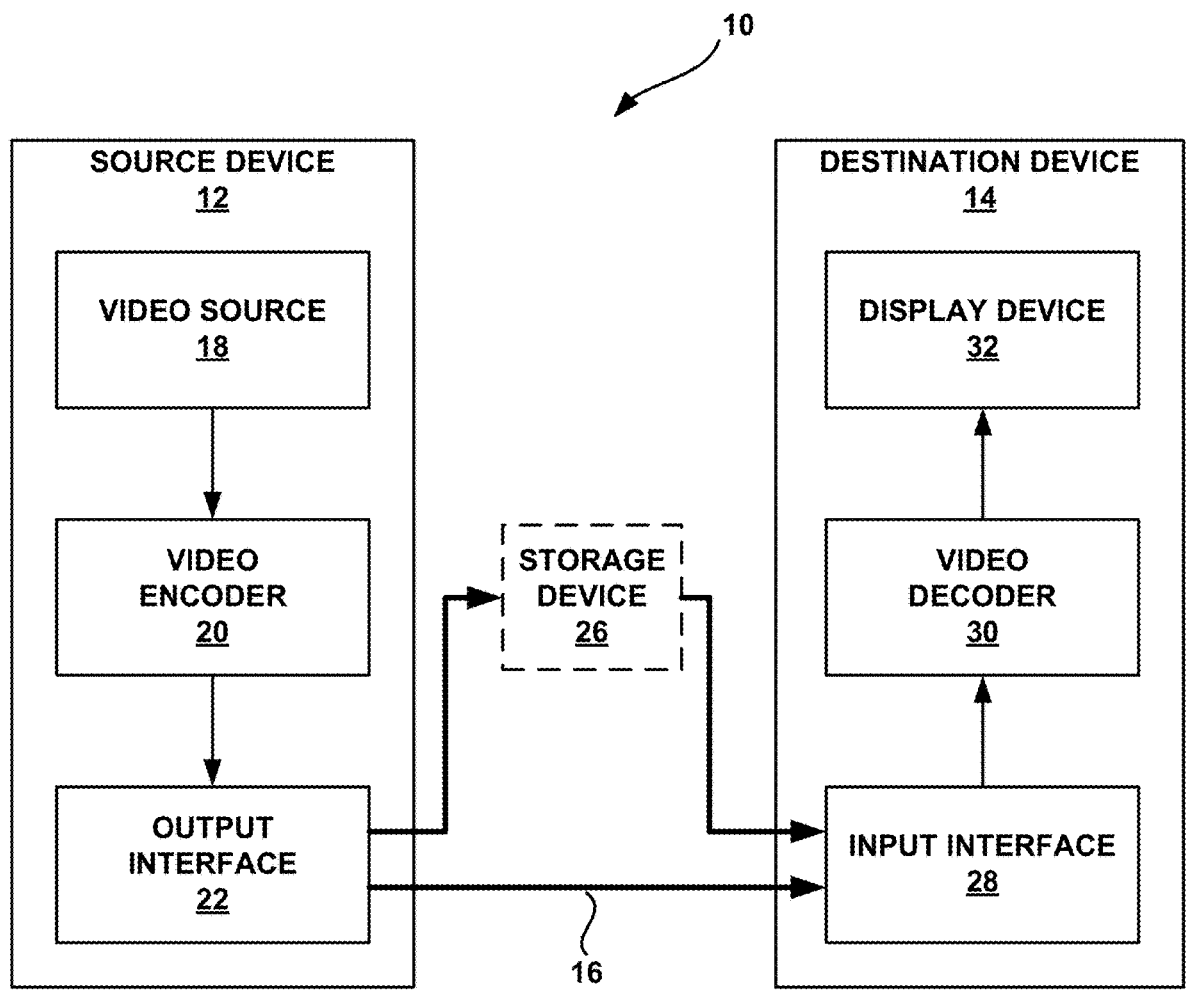
FIG. 1 is a block diagram illustrating an example video encoding and decoding system that may utilize the techniques described in this disclosure.

This disclosure describes techniques related to a filtering method which could be used in a post-processing stage, as part of in-loop coding, or in the prediction stage. The techniques of this disclosure may be implemented into existing video codecs, such as HEVC (High Efficiency Video Coding), or be an efficient coding tool for a future video coding standard, such as the H.266 standard presently under development.

Sample adaptive offset (SAO) filtering is a type of loop filtering used in video coding. In general, the addition of offset values to samples in a video frame (e.g., a reconstructed image) may in some instances improve coding without greatly increasing the bit overhead needed to store or transmit encoded video data. The improvement in coding that potentially results from SAO filtering may be, for example, that a better rate-distortion (RD) tradeoff may be achieved when encoding the video data, and/or that a decoded video image contains less distortion relative to an original video image for a given bit rate. SAO techniques allow for different offset values to be applied to different samples (or blocks of samples) depending on sample (or block) classification metrics, such as edge metrics, band metrics, or other types of metrics.

In some implementations, an SAO filter unit may be configured to perform two types of SAO filtering, generally referred to in this disclosure as band offset (BO) filtering and edge offset (EO) filtering. An SAO filter unit may also at times apply no offset, which can itself be considered a third type of SAO filtering. The type of offset filtering applied by an SAO filter may be either explicitly or implicitly signaled to a video decoder. When applying EO filtering, samples can be classified based on edge information of a coding tree unit (CTU), and an offset can be determined for samples based on the edge classification. As will be explained in greater detail below, there are typically four variations of edge-based SAO, where the value of a sample is compared to two of the sample's eight neighboring samples. Which two samples are used for comparison depends on which variation of edge-based offset is used. That is, the explicitly/implicitly signaled EO pattern is used to choose the two samples used for comparison. In this disclosure, based on the magnitude difference of the sample relative to the neighboring samples, an offset is added to the sample value.

When applying BO filtering, samples can be classified into different bands based on a sample value, such as an intensity value, with each band having an associated offset. A band includes a range of sample values. For example, sample values ranging from 0 to 255 may be divided into 32 equal bands (labeled 0 to 31), such that sample values 0-7 are a first band, sample values 8-15 are a second band, sample values 16-23 are a third band, and so on for all thirty-two bands. The bands can be used for determining which particular offset value, of a plurality of different offset values, to apply to a sample or group of samples. For example, if a sample has a value of 10 (which is within the second band, i.e. values 8-15, in the example above), then an offset associated with the second band can be added to the sample value.

For purposes of signaling and generating the offsets for the various bands, the bands may be grouped into two or more groups. For BO filtering, samples may, for example, be categorized into thirty-two bands (bands 0-31) as described above, and the bands may be grouped into two groups (e.g., two groups of sixteen bands, one group of four bands and one group of twenty-eight bands, one group of eight bands and one group of twenty-four bands, or other such groupings). The groupings of bands can be used for determining the order in which the offset values for the bands are signaled in the encoded video bitstream, and/or can be used to determine if a particular band has an offset value other than zero. Offsets for the bands may be signaled using differential coding techniques in which a current value is signaled as a difference between the current value and a previous value. In order to reduce signaling overhead, only a small number of bands (e.g. four bands) may be associated with non-zero offset values, while all other bands are assumed to have an offset value of zero.

As implemented in the HEVC standard, SAO filtering may be enabled and disabled at the slice level, and furthermore, SAO filtering may be enabled and disabled separately for luma and chroma samples. For example, for a particular slice of video data, both luma and chroma samples may be SAO filtered; neither luma nor chroma samples may be SAO filtered; or one of luma and chroma samples may be SAO filtered while the other is not. When SAO filtering is enabled for a slice, then SAO type and offset values are signaled at a coding tree unit (CTU) level. As introduced above, the SAO type can include BO filtering, EO filtering, or no SAO filtering. Thus, even if SAO filtering is enabled for a particular slice, some CTUs of that slice may not be SAO filtered (i.e. some CTUs will have an SAO type of no SAO filtering). In some instances, the SAO type and the offset values may be signaled with a series of merge flags, where a true value for a first merge flag indicates the offset type and the offset values for the CTU are inherited from a left neighboring CTU, and a true value for a second merge flag indicates the SAO type and the offset values are inherited from an above neighboring CTU. If both merge flags are false, then a new SAO type and new offset values are sent for the CTU.

It should be understood that although HEVC enables and disables SAO filtering at a slice level and signals SAO information at an CTU level, it is contemplated that the techniques of this disclosure may be implemented in SAO configurations where such signaling occurs at a different level or in SAO configurations that use different signaling mechanisms altogether.

SAO information (e.g. an SAO type and a plurality of offset values) is signaled for a CTU. Based on the SAO type, a video decoder determines on a sample-by-sample basis which offset value from the plurality of offset values to add for each sample. As will be explained in greater detail below, the determination of which offset value to apply for a particular sample or block of samples (e.g. a 2×2 block in the CTU) may be determined based on the edge and band classifications determined for the particular sample of block of samples.

This disclosure describes a new version of SAO, referred to herein as peak SAO. Peak SAO may be an additional SAO type used in conjunction with EO or BO filtering described above, or may be implemented as a new coding tool separate from the SAO filter described above. When implementing peak SAO, a video decoder may apply different offsets to two or more samples in a current block of video data, even if the relationship of the samples and its neighboring samples are the same. As one example of peak SAO, a video decoder may compare a first sample to four neighboring samples to determine that the sample has a slightly greater sample value (e.g., luminance value or chrominance value) than all four neighboring samples. Based on the first sample having the slightly greater sample value, the video decoder may apply a first offset to the first sample. For a second sample, the video decoder may compare the second sample to four similarly located neighboring samples to determine that the sample has a much greater sample value than all four neighboring samples. Based on the second sample having the much greater sample value, the video decoder may apply, to the second sample, a different offset than the offset used for the first sample. The different offset may, for example, be a single offset value that is different than the first offset or may be a combination of two offsets, such as the first offset plus an additional offset.

In traditional SAO, the video decoder would apply the same offset to both the first and second samples described above because the first and second sample have the same relationship (i.e., greater than all) relative to their neighboring samples. In peak SAO, however, the video decoder applies different offsets to the first and second samples because the value of the first sample is only slightly greater than its neighboring samples, whereas the value of the second sample is much greater than its neighboring samples. Furthermore, in traditional SAO, a sample is only compared to two neighboring samples, whereas in peak SAO the sample may be compared to other numbers of neighboring samples, such as 4 or 8 neighbors. These and other aspects of peak SAO will be described in more detail below.

Hence, traditional SAO techniques do not provide granularity for selecting different offsets for different samples having different magnitudes for the same characteristic relative to neighboring samples. For example, in traditional SAO, a video coder applies the same offset to a sample having a slightly greater value relative to neighbor samples as to a sample having a much greater value relative to neighbor samples. This disclosure describes example techniques applicable to video coders that potentially result in video coders having better rate-distortion tradeoff. For instance, the video coders, described in this disclosure, may allow for different offsets for different samples of a block based their respective differences with neighboring samples.

Various techniques in this disclosure may be described with reference to a video coder, which is intended to be a generic term that can refer to either a video encoder or a video decoder. Unless explicitly stated otherwise, it should not be assumed that techniques described with respect to a video encoder or a video decoder cannot be performed by the other of a video encoder or a video decoder. For example, in many instances, a video decoder performs the same, or sometimes a reciprocal, coding technique as a video encoder in order to decode encoded video data. In many instances, a video encoder also includes a video decoding loop, and thus the video encoder performs video decoding as part of encoding video data. Thus, unless stated otherwise, the techniques described in this disclosure with respect to a video decoder may also be performed by a video encoder, and vice versa.

This disclosure may also use terms such as current block, current picture, etc. In the context of this disclosure, the term "current" is intended to identify a block or picture that is currently being coded, as opposed to, for example, previously or already coded block or picture, or a yet to be coded block or picture.

This disclosure will describe various video coding techniques using HEVC terminology for ease of explanation. It should not be assumed, however, that the techniques of this disclosure are limited to HEVC, and in fact, it is explicitly contemplated that the techniques of this disclosure may be implemented in successor standards to HEVC and its extensions.

FIG. 1 is a block diagram illustrating an example video encoding and decoding system 10 that may utilize the techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In another example, encoded data may be output from output interface 22 to a storage device 26. Similarly, encoded data may be accessed from storage device 26 by input interface. Storage device 26 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 26 may correspond to a file server or another intermediate storage device that may hold the encoded video generated by source device 12. Destination device 14 may access stored video data from storage device 26 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 26 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 26 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 26, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the recently finalized High Efficiency Video Coding (HEVC) standard and may conform to the HEVC Test Model (HM). Video encoder 20 and video decoder 30 may additionally operate according to an HEVC extension, such as the range extension, the multiview extension (MV-HEVC), or the scalable extension (SHVC) which have been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

Video encoder 20 and video decoder 30 may also operate according to other proprietary or industry standards, such as the ITU-T H.264 standard, alternatively referred to as ISO/IEC MPEG-4, Part 10, Advanced Video Coding (AVC), or extensions of such standards, such as the Scalable Video Coding (SVC) and Multi-view Video Coding (MVC) extensions. The techniques of this disclosure, however, are not limited to any particular coding standard. Other examples of video compression standards include ITU-T H.261, ISO/IEC MPEG-1 Visual, ITU-T H.262 or ISO/IEC MPEG-2 Visual, ITU-T H.263, and ISO/IEC MPEG-4 Visual.

ITU-T VCEG (Q6/16) and ISO/IEC MPEG (JTC 1/SC 29/WG 11) are now studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. The JVET first met during 19-21 Oct. 2015. One version of reference software, i.e., Joint Exploration Model 2 (JEM 2) can be downloaded from: https://jvet.hhi.fraunhofer.de/svn/svn_HMJEMSoftware/tags/HM-16.6-JEM-2.0/. An algorithm for JEM2 is described in J. Chen, E. Alshina, G. J. Sullivan, J.-R. Ohm, J. Boyce, "Algorithm description of Joint Exploration Test Model 2", JVET-B1001, San Diego, March 2016, which description is incorporated herein by reference. Another version of the reference software, i.e., Joint Exploration Model 3 (JEM 3) can be downloaded from: https://jvet.hhi.fraunhofer.de/svn/svn_HMJEMSoftware/tags/HM-16.6-JEM-3.0/. The Algorithm description for JEM3 may also be referred to as JVET-C1001 and is incorporated herein by reference.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In HEVC and other video coding specifications, a video sequence typically includes a series of pictures. Pictures may also be referred to as "frames." In one example approach, a picture may include three sample arrays, denoted $S_L$, $S_{Cb}$, and $S_{Cr}$. In such an example approach, $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

To generate a coded CTU, video encoder 20 may recursively perform quad-tree partitioning on the coding tree blocks of a CTU to divide the coding tree blocks into coding blocks, hence the name "coding tree units." A coding block may be an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU. If video encoder 20 uses inter prediction to generate the predictive blocks of a PU, video encoder 20 may generate the predictive blocks of the PU based on decoded samples of one or more pictures other than the picture associated with the PU.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb, and Cr residual blocks of a CU into one or more luma, Cb, and Cr transform blocks. A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

The above block structure with CTUs, CUs, PUs, and TUs generally describes the block structure used in HEVC. Other video coding standards, however, may use different block structures. As one example, although HEVC allows PUs and TUs to have different sizes or shapes, other video coding standards may require predictive blocks and transform blocks to have a same size. The techniques of this disclosure are not limited to the block structure of HEVC and may be compatible with other block structures.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. The bitstream may comprise a sequence of Network Abstraction Layer (NAL) units. A NAL unit is a syntax structure containing an indication of the type of data in the NAL unit and bytes containing that data in the form of a raw byte sequence payload (RB SP) interspersed as necessary with emulation prevention bits. Each of the NAL units includes a NAL unit header and encapsulates a RBSP. The NAL unit header may include a syntax element that indicates a NAL unit type code. The NAL unit type code specified by the NAL unit header of a NAL unit indicates the type of the NAL unit. A RB SP may be a syntax structure containing an integer number of bytes that is encapsulated within a NAL unit. In some instances, an RB SP includes zero bits.

Different types of NAL units may encapsulate different types of RBSPs. For example, a first type of NAL unit may encapsulate an RBSP for a PPS, a second type of NAL unit may encapsulate an RBSP for a coded slice, a third type of NAL unit may encapsulate an RBSP for SEI messages, and so on. NAL units that encapsulate RBSPs for video coding data (as opposed to RBSPs for parameter sets and SEI messages) may be referred to as VCL NAL units.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. In addition, video decoder 30 may inverse quantize coefficient blocks associated with TUs of a current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

Figure 2:
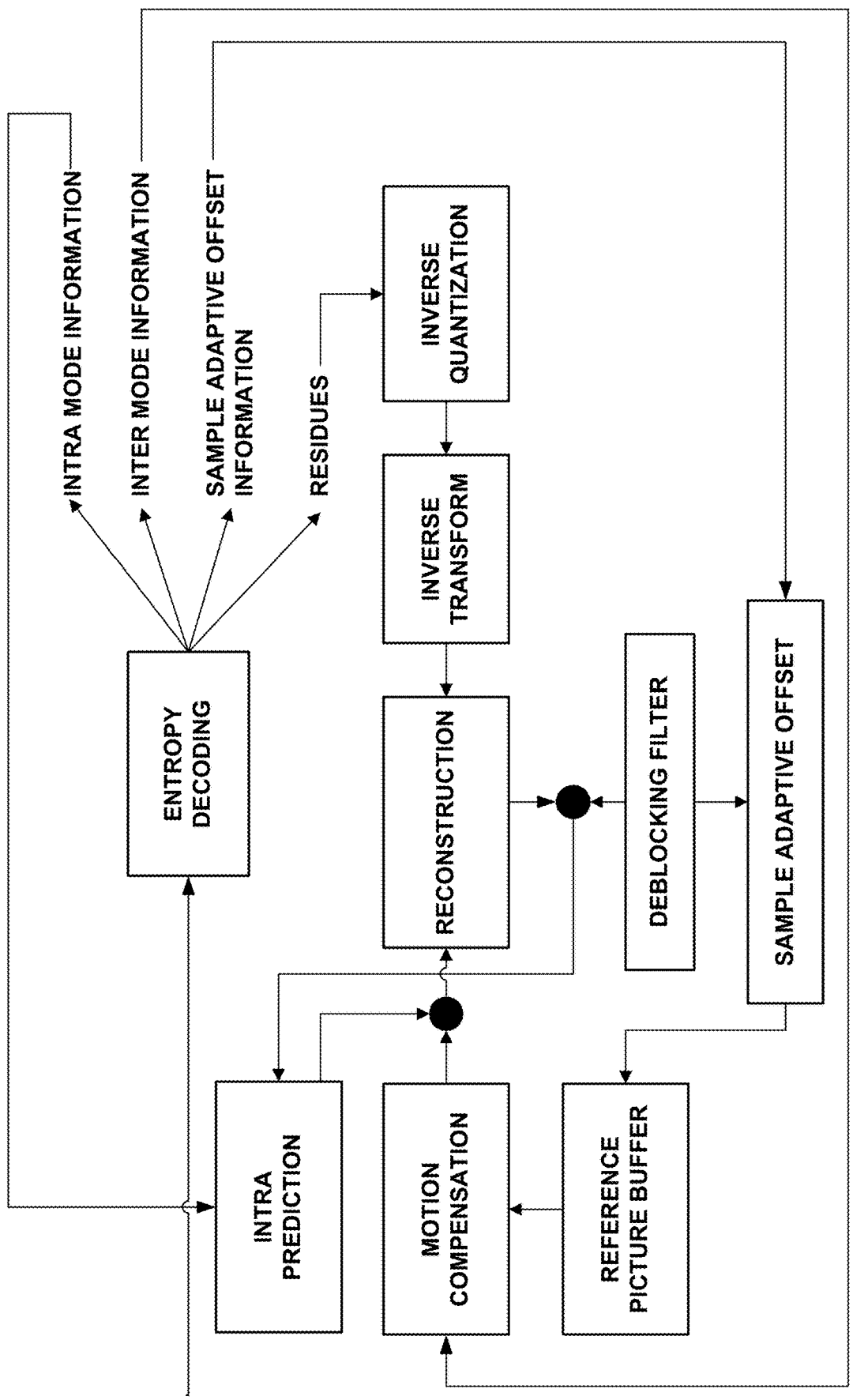
FIG. 2 shows an example block diagram of an HEVC decoder.

Aspects of HEVC and JEM techniques will now be discussed. FIG. 2 shows an example block diagram of an HEVC decoder. The video decoder shown in FIG. 2 may correspond to video decoder 30 described above, and which will be described in more detail below. HEVC employs two in-loop filters including de-blocking filter (DBF) and SAO. Additional details regarding HEVC decoding and SAO are described in C. Fu, E. Alshina, A. Alshin, Y. Huang, C. Chen, Chia. Tsai, C. Hsu, S. Lei, J. Park, W. Han, "Sample adaptive offset in the HEVC standard," IEEE Trans. Circuits Syst. Video Technol., 22(12): 1755-1764 (2012).

As illustrated, the input to a DBF may be the reconstructed image after intra or inter prediction, as shown with the output from the reconstruction block. The DBF performs detection of the artifacts at the coded block boundaries and attenuates them by applying a selected filter. Compared to the H.264/AVC deblocking filter, the HEVC deblocking filter has lower computational complexity and better parallel processing capabilities while still achieving significant reduction of the visual artifacts. For additional examples, see A. Norkin, G. Bjontegaard, A. Fuldseth, M. Narroschke, M. Ikeda, K. Andersson, Minhua Zhou, G. Van der Auwera, "HEVC Deblocking Filter," IEEE Trans. Circuits Syst. Video Technol., 22(12): 1746-1754 (2012).

The input to SAO may be the reconstructed image after invoking deblocking filtering, as shown with the output from the deblocking filter. The concept of SAO is to reduce mean sample distortion of a region by first classifying the region samples into multiple categories with a selected classifier, obtaining an offset for each category, and then adding the offset to each sample of the category, where the classifier index and the offsets of the region are coded in the bitstream. In HEVC, the region (the unit for SAO parameters signaling) is defined to be a CTU.

Two SAO types that can satisfy the requirements of low complexity are adopted in HEVC. Those two types are EO and BO as introduced above. An index of an SAO type is coded (which is in the range of [0, 2]). In the context of signaling an SAO type, not performing SAO or skipping SAO may be considered a third type of SAO. For EO, the sample classification is based on comparison between current samples and neighboring samples according to 1-D directional patterns: horizontal, vertical, 135° diagonal, and 45° diagonal.

Figure 3A:
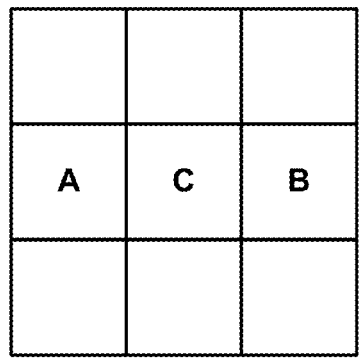
FIGS. 3A-3D show four 1-D directional patterns for edge offset (EO) sample classification.
Figure 3B:
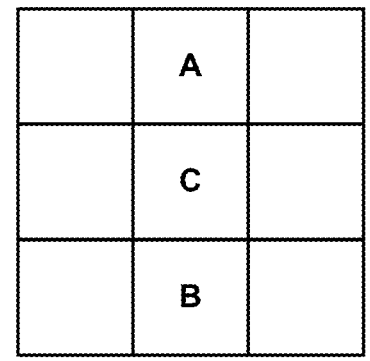
Figure 3C:
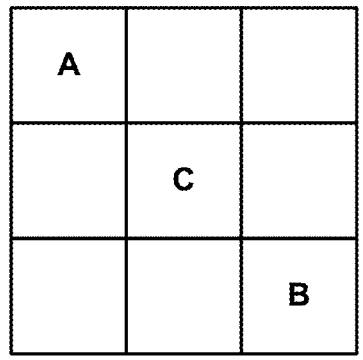
Figure 3D:
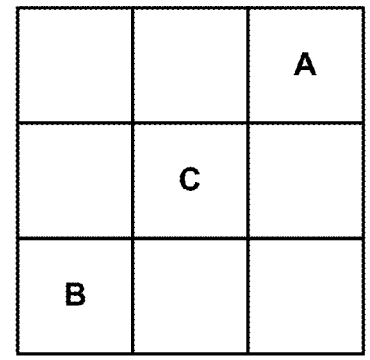

FIGS. 3A-3D show four 1-D directional patterns for EO sample classification: horizontal (FIG. 3A, EO class=0), vertical (FIG. 3B, EO class=1), 135° diagonal (FIG. 3C, EO class=2), and 45° diagonal (FIG. 3D, EO class=3). Additional details related to SAO are described in C. Fu, E. Alshina, A. Alshin, Y. Huang, C. Chen, Chia. Tsai, C. Hsu, S. Lei, J. Park, W. Han, "Sample adaptive offset in the HEVC standard," IEEE Trans. Circuits Syst. Video Technol., 22(12): 1755-1764 (2012).

According to the selected EO pattern, five categories denoted by edgeIdx in Table I are further defined. For edgeIdx equal to 0~3, the magnitude of an offset may be signaled while the sign flag is implicitly coded, i.e., negative offset for edgeIdx equal to 0 or 1 and positive offset for edgeIdx equal to 2 or 3. For edgeIdx equal to 4, the offset is always set to 0 which means no operation is required for this case.

TABLE I classification for EO

| Category (edgeIdx) | Condition |
|---|---|
| 0 | c < a && c < b |
| 1 | (c < a && c == b ) \|\| (c==a && c < b) |
| 2 | (c > a && c == b) \|\| (c == a && c > b) |
| 3 | c > a && c > b |
| 4 | None of the above |

For BO, the sample classification is based on sample values. Each color component may have its own SAO parameters for classification for BO type SAO filtering. BO implies one offset is added to all samples of the same band. The sample value range is equally divided into 32 bands. For 8-bit samples ranging from 0 to 255, the width of a band is 8, and sample values from 8 k to 8 k+7 belong to band k, where k ranges from 0 to 31. The average difference between the original samples and reconstructed samples in a band (i.e., offset of a band) is signaled to the decoder (e.g., video decoder 30). There is no constraint on offset signs. Only offsets of four consecutive bands and the starting band position are signaled to the decoder (e.g., video decoder 30).

For signaling of side information, to reduce side information, multiple CTUs can be merged together (either copying the parameters from above CTU (through setting sao_merge_left_flag equal to 1) or left CTU (through setting sao_merge_up_flag equal to 1) to share SAO parameters.

Syntax Tables

| Coding tree unit syntax | |
|---|---|
| | Descriptor |
| coding_tree_unit( ) { | |
|   xCtb = ( CtbAddrInRs % PicWidthInCtbsY ) << CtbLog2SizeY | |
|   yCtb = ( CtbAddrInRs / PicWidthInCtbsY ) << CtbLog2SizeY | |
|   if( slice_sao_luma_flag \|\| slice_sao_chroma_flag ) | |
|     sao( xCtb >> CtbLog2SizeY, yCtb >> CtbLog2SizeY ) | |
|   coding_quadtree( xCtb, yCtb, CtbLog2SizeY, 0 ) | |
| } | |

| Sample adaptive offset syntax | |
|---|---|
| | Descriptor |
| sao( rx, ry ) { | |
|   if( rx > 0 ) { | |
|     leftCtbInSliceSeg = CtbAddrInRs > SliceAddrRs | |
|     leftCtbInTile = TileId[ CtbAddrInTs ] == TileId[ CtbAddrRsToTs[ CtbAddrInRs − 1 ] ] | |
|     if( leftCtbInSliceSeg && leftCtbInTile) | |

-continued

| Sample adaptive offset syntax | |
|---|---|
| | Descriptor |
|       sao_merge_left_flag | ae(v) |
|   } | |
|   if( ry > 0 && !sao_merge_left_flag ) { | |
|     upCtbInSliceSeg = ( CtbAddrInRs − PicWidthInCtbsY ) >= SliceAddrRs | |
|     upCtbInTile = TileId[ CtbAddrInTs ] == TileId[ CtbAddrRsToTs[ CtbAddrInRs − PicWidthInCtbsY ] ] | |
|     if( upCtbInSliceSeg && upCtbInTile) | |
|       sao_merge_up_flag | ae(v) |
|   } | |
|   if( !sao_merge_up_flag && !sao_merge_left_flag ) | |
|     for( cIdx = 0; cIdx < ( ChromaArrayType != 0 ? 3 : 1 ); cIdx++ ) | |
|       if( ( slice_sao_luma_flag && cIdx == 0 ) \|\| ( slice_sao_chroma_flag && cIdx > 0 ) ) { | |
|         if( cIdx == 0 ) | |
|           sao_type_idx_luma | ae(v) |
|         else if( cIdx == 1 ) | |
|           sao_type_idx_chroma | ae(v) |
|         if( SaoTypeIdx[ cIdx ][ rx ][ ry ] != 0 ) { | |
|           for( i = 0; i < 4; i++) | |
|             sao_offset_abs[ cIdx ][ rx ][ ry ][ i ] | ae(v) |
|           if( SaoTypeIdx[ cIdx ][ rx ][ ry ] == 1 ) { | |
|             for( i = 0; i < 4; i++ ) | |
|               if( sao_offset_abs[ cIdx ][ rx ][ ry ][ i ] != 0 ) | |
|                 sao_offset_sign[ cIdx ][ rx ][ ry ][ i ] | ae(v) |
|             sao_band_position[ cIdx ][ rx ][ ry ] | ae(v) |
|           } else { | |
|             if( cIdx == 0 ) | |
|               sao_eo_class_luma | ae(v) |
|             if( cIdx == 1 ) | |
|               sao_eo_class_chroma | ae(v) |
|           } | |
|         } | |
|       } | |
| } | |

Semantics sao_merge_left_flag equal to 1 specifies that the syntax elements sao_type_idx_luma, sao_type_idx_chroma, sao_band_position, sao_eo_class_luma, sao_eo_class_chroma, sao_offset_abs, and sao_offset_sign are derived from the corresponding syntax elements of the left coding tree block. sao_merge_left_flag equal to 0 specifies that these syntax elements are not derived from the corresponding syntax elements of the left coding tree block. When sao_merge_left_flag is not present, it is inferred to be equal to 0.

sao_merge_up_flag equal to 1 specifies that the syntax elements sao_type_idx_luma, sao_type_idx_chroma, sao_band_position, sao_eo_class_luma, sao_eo_class_chroma, sao_offset_abs, and sao_offset_sign are derived from the corresponding syntax elements of the above coding tree block. sao_merge_up_flag equal to 0 specifies that these syntax elements are not derived from the corresponding syntax elements of the above coding tree block. When sao_merge_up_flag is not present, it is inferred to be equal to 0.

sao_type_idx_luma specifies the offset type for the luma component. The array SaoTypeIdx[cIdx][rx][ry] specifies the offset type as specified in Table 7-8 for the coding tree block at the location (rx, ry) for the colour component cIdx. The value of SaoTypeIdx[0][rx][ry] is derived as follows:

If sao_type_idx_luma is present, SaoTypeIdx[0][rx][ry] is set equal to sao_type_idx_luma.

Otherwise (sao_type_idx_luma is not present), SaoTypeIdx[0][rx][ry] is derived as follows:
  If sao_merge_left_flag is equal to 1, SaoTypeIdx[0][rx][ry] is set equal to SaoTypeIdx[0][rx−1][ry].
  Otherwise, if sao_merge_up_flag is equal to 1, SaoTypeIdx[0][rx][ry] is set equal to SaoTypeIdx[0][rx][ry−1].
  Otherwise, SaoTypeIdx[0][rx][ry] is set equal to 0.

sao_type_idx_chroma specifies the offset type for the chroma components. The values of SaoTypeIdx[cIdx][rx][ry] are derived as follows for cIdx equal to 1..2:
  If sao_type_idx_chroma is present, SaoTypeIdx[cIdx][rx][ry] is set equal to sao_type_idx_chroma.
  Otherwise (sao_type_idx_chroma is not present), SaoTypeIdx[cIdx][rx][ry] is derived as follows:
    If sao_merge_left_flag is equal to 1, SaoTypeIdx[cIdx][rx][ry] is set equal to SaoTypeIdx[cIdx][rx−1][ry].
    Otherwise, if sao_merge_up_flag is equal to 1, SaoTypeIdx[cIdx][rx][ry] is set equal to SaoTypeIdx[cIdx][rx][ry−1].
    Otherwise. SaoTypeIdx[cIdx][rx][ry] is set equal to 0.

TABLE 7-8

Specification of the SAO type

| SaoTypeIdx[ cIdx ][ rx ][ ry ] | SAO type (informative) |
|---|---|
| 0 | Not applied |
| 1 | Band offset |
| 2 | Edge offset | sao_offset_abs[cIdx][rx][ry][i] specifies the offset value of i-th category for the coding tree block at the location (rx, ry) for the colour component cIdx.
When sao_offset_abs[cIdx][rx][ry][i] is not present, it is inferred as follows:
  If sao_merge_left_flag is equal to 1, sao_offset_abs[cIdx][rx][ry][i] is inferred to be equal to sao_offset_abs[cIdx][rx−1][ry][i].
  Otherwise, if sao_merge_up_flag is equal to 1, sao_offset_abs[cIdx][rx][ry][i] is inferred to be equal to sao_offset_abs[cIdx][rx][ry−1][i].
  Otherwise, sao_offset_abs[cIdx][rx][ry][i] is inferred to be equal to 0.

sao_offset_sign[cIdx][rx][ry][i] specifies the sign of the offset value of i-th category for the coding tree block at the location (rx, ry) for the colour component cIdx.
When sao_offset_sign[cIdx][rx][ry][i] is not present, it is inferred as follows:
  If sao_merge_left_flag is equal to 1, sao_offset_sign[cIdx][rx][ry][i] is inferred to be equal to sao_offset_sign[cIdx][rx−1][ry][i].
  Otherwise, if sao_merge_up_flag is equal to 1, sao_offset_sign[cIdx][rx][ry][i] is inferred to be equal to sao_offset_sign[cIdx][rx][ry−1][i].
  Otherwise, if SaoTypeIdx[cIdx][rx][ry] is equal to 2, the following applies:
    If i is equal to 0 or 1, sao_offset_sign[cIdx][rx][ry][i] is inferred to be equal 0.
    Otherwise (i is equal to 2 or 3), sao_offset_sign[cIdx][rx][ry][i] is inferred to be equal 1.
  Otherwise, sao_offset_sign[cIdx][rx][ry][i] is inferred to be equal 0.

The variable log 2OffsetScale is derived as follows:
  If cIdx is equal to 0, log 2OffsetScale is set equal to log2_sao_offset_scale_luma.
  Otherwise (cIdx is equal to 1 or 2), log 2OffsetScale is set equal to log2_sao_offset_scale_chroma.

The list SaoOffsetVal[cIdx][rx][ry][i] for i ranging from 0 to 4, inclusive, is derived as follows:

$Sao$OffsetVal[cIdx][rx][ry][0]=0 for($i$=0; $i$<4; $i$++)

$Sao$OffsetVal[cIdx][rx][ry][i+1]=(1−2*
sao_offset_sign[cIdx][rx][ry][i])*sao_offset_abs
[cIdx][rx][ry][i]>>log 2OffsetScale  (7-72)

sao_band_position[cIdx][rx][ry] specifies the displacement of the band offset of the sample range when SaoTypeIdx[cIdx][rx][ry] is equal to 1.
When sao_band_position[cIdx][rx][ry] is not present, it is inferred as follows:
  If sao_merge_left_flag is equal to 1, sao_band_position[cIdx][rx][ry] is inferred to be equal to sao_band_position[cIdx][rx−1][ry].
  Otherwise, if sao_merge_up_flag is equal to 1, sao_band_position[cIdx][rx][ry] is inferred to be equal to sao_band_position[cIdx][rx][ry−1].
  Otherwise, sao_band_position[cIdx][rx][ry] is inferred to be equal to 0.

sao_eo_class_luma specifies the edge offset class for the luma component. The array SaoEoClass[cIdx][rx][ry] specifies the offset type as specified in Table 7-9 for the coding tree block at the location (rx, ry) for the colour component cIdx. The value of SaoEoClass[0][rx][ry] is derived as follows:
  If sao_eo_class_luma is present, SaoEoClass[0][rx][ry] is set equal to sao_eo_class_luma.
  Otherwise (sao_eo_class_luma is not present), SaoEoClass[0][rx][ry] is derived as follows:
    If sao_merge_left_flag is equal to 1, SaoEoClass[0][rx][ry] is set equal to SaoEoClass[0][ rx−1][ ry].
    Otherwise, if sao_merge_up_flag is equal to 1, SaoEoClass[0][rx][ry] is set equal to SaoEoClass[0][rx][ry−1].
    Otherwise, SaoEoClass[0][rx][ry] is set equal to 0.

sao_eo_class_chroma specifies the edge offset class for the chroma components. The values of SaoEoClass[cIdx][rx][ry] are derived as follows for cIdx equal to 1..2:
  If sao_eo_class_chroma is present, SaoEoClass[cIdx][rx][ry] is set equal to sao_eo_class_chroma.
  Otherwise (sao_eo_class_chroma is not present), SaoEoClass[cIdx][rx][ry] is derived as follows:
    If sao_merge_left_flag is equal to 1, SaoEoClass[cIdx][rx][ry] is set equal to SaoEoClass[cIdx][rx−1][ry].
    Otherwise, if sao_merge_up_flag is equal to 1, SaoEoClass[cIdx][rx][ry] is set equal to SaoEoClass[cIdx][rx][ry−1].
    Otherwise, SaoEoClass[cIdx][rx][ry] is set equal to 0.

TABLE 7-9

Specification of the SAO edge offset class

| SaoEoClass[ cIdx ][ rx ][ ry ] | SAO edge offset class (informative) |
|---|---|
| 0 | 1D 0-degree edge offset |
| 1 | 1D 90-degree edge offset |
| 2 | 1D 135-degree edge offset |
| 3 | 1D 45-degree edge offset |

Video encoder 20 and video decoder 30 may be configured to implement various JEM filter filtering techniques. Aspects of those JEM filtering techniques will now be described. In addition to the modified DB and HEVC SAO methods, JEM has included another filtering method, called Geometry transformation-based Adaptive Loop Filtering (GALF). GALF aims to improve the coding efficiency of ALF studied in HEVC stage by introducing several new aspects. ALF is aiming to minimize the mean square error between original samples and decoded samples by using Wiener-based adaptive filter. Samples in a picture are classified into multiple categories and the samples in each category are then filtered with their associated adaptive filter. The filter coefficients may be signaled or inherited to optimize the trade off between the mean square error and the overhead. The Geometry transformation-based ALF (GALF) scheme was proposed to further improve the performance of ALF, which introduces geometric transformations, such as rotation, diagonal and vertical flip, to be applied to the samples in filter support region depending on the orientation of the gradient of the reconstructed samples before ALF.

The input to ALF/GALF may be the reconstructed image after invoking SAO (e.g., output of sample adaptive offset in FIG. 2). As described in M. Karczewicz, L. Zhang, W.-J. Chien, X. Li, "EE2.5: Improvements on adaptive loop filter," Exploration Team (JVET) of ITU-T SG 16 WP 3 and ISO/IEC JTC 1/SC 29/WG 11, Doc. JVET-B0060, $2^{nd}$ Meeting: San Diego, USA, 20 Feb.-26 Feb. 2016 and M. Karczewicz, L. Zhang, W.-J. Chien, X. Li, "EE2.5: Improvements on adaptive loop filter," Exploration Team (JVET) of ITU-T SG 16 WP 3 and ISO/IEC JTC 1/SC 29/WG 11, Doc. JVET-c0038, $3^{rd}$ Meeting: Geneva, CH, 26 May-1 Jun. 2016, the Geometric transformations-based ALF (GALF) is proposed and it has been adopted to the most recent version of JEM, i.e., JEM3.0. In GALF, the classification is modified with the diagonal gradients taken into consideration and geometric transformations could be applied to filter coefficients. Each 2×2 block is categorized into one out of 25 classes based on its directionality and quantized value of activity. The details are described in the following subsections.

Video encoder 20 and video decoder 30 may be configured to predict filters from fixed filters. In addition, to improve coding efficiency when temporal prediction is not available (intra frames), a set of 16 fixed filters is assigned to each class. To indicate the usage of the fixed filter, a flag for each class is signaled and if required, the index of the chosen fixed filter. Even when the fixed filter is selected for a given class, the coefficients of the adaptive filter $f(k,l)$ can still be sent for this class in which case the coefficients of the filter which will be applied to the reconstructed image are sum of both sets of coefficients. Number of classes can share the same coefficients $f(k,l)$ signaled in the bitstream even if different fixed filters were chosen for them. As explained in U.S. Provisional Patent Application 62/295,461 filed 15 Feb. 2016 and U.S. Provisional Patent Application 62/324,776 filed 19 Apr. 2016, fixed filters may also be applied to inter-coded frames.

Video encoder 20 and video decoder 30 may be configured to perform temporal prediction of filter coefficients. Aspects of temporal prediction of filter coefficients will now be described. The ALF coefficients of reference pictures are stored and allowed to be reused as ALF coefficients of a current picture. The current picture may choose to use ALF coefficients stored for the reference pictures, and bypass the ALF coefficients signalling. In this case, only an index to one of the reference pictures is signalled, and the stored ALF coefficients of the indicated reference picture are simply inherited for the current picture. To indicate the usage of temporal prediction, one flag is firstly coded before sending the index.

The design of HEVC/JEM may have several potential problems. As one example of a potential problem, the SAO only takes the 1-D direction information for classification which may limit the coding performance. As another example of a potential problem, the EO of SAO in HEVC utilizes two level signaling including the pattern and category. In the SAO in HEVC, for each category within a pattern, only one offset may be added to samples without considering how far the difference is between neighbor samples and current sample. As another example of a potential problem, it is observed that SAO parameters could be similar for two blocks which are not located in the left/above direction. Therefore, allowing flexible merging of parameters from different blocks may bring additional coding gains. As another example of a potential problem, several in-loop filtering methods need to process the reconstructed image several times which may increase the bandwidth and computation complexity.

To potentially solve the problems introduced above, this disclosure describes technique for a new filtering method, referred to in this disclosure as peak SAO, wherein the amount of differences, rather than there merely being a difference, of selected neighboring samples and current sample may be utilized to derive more than one offset. In addition, more neighboring samples may be utilized, and more sophisticated criteria for classification may be introduced. The techniques for peak SAO described in this disclosure may be implemented into an SAO filter as an additional SAO type (e.g., in addition to EO and BO) or may be a replacement for an existing SAO type, such as EO. The proposed techniques may also be applicable to existing SAO techniques. Video encoder 20 and video decoder 30 may apply the following described techniques either individually or, unless stated to the contrary, in any combination.

Video encoder 20 and video decoder 30 may be configured to perform peak SAO filtering. Aspects of the structure of peak SAO will now be described. According to one example, three categories of peak SAO information may be signaled from video encoder 20 to video decoder 30 using, for example, either three syntax elements or a combination of explicit signaling and derivation techniques that do not require explicit signaling. The first category of peak SAO information is type information. The type may be used for classification, and each type may have one or more associated groups (the second category of peak SAO information). In addition, for each group within a type, one or more classes (the third category of peak SAO information) may be defined.

Type defines the rule(s) of selecting neighboring samples and/or separate or joint signaling. For example, the type may define how many of the neighboring samples and the template of the neighboring samples that are used for the selection of filter parameters (e.g., the offset values). As examples, a first type may specify four neighboring samples that are to be used for determining filter parameters; a second type may specify four different neighboring samples that are to be used for determining filter parameters; and, and a third type may specify that eight neighboring samples are to be used for determining filter parameters. Group defines the rule of samples which should be filtered, and/or defines the rule(s) to select neighboring samples in the template. In some examples, if a sample is not classified into any group, then the sample is not filtered. Class indicates which offset should be used to modify the samples. For example, the sample differences between the current sample and selected neighboring samples may be evaluated and used to derive a class index. Different class may have its own offset value.

Aspects of type definition will now be described in more detail. A type tells which of the neighboring samples are to be used for the selection of filter parameters. According to one example, instead of always using 2 spatial neighboring samples according to the 1-D direction as in HEVC SAO, more neighboring samples including spatial, and/or temporal neighbors, may be utilized to decide the type, and/or group and/or class. The definition of neighboring samples may also be applicable to the SAO in HEVC. N denotes the number of neighboring samples utilized for type determination. N is positive value and may, for example, be larger than 2.

In another example, the neighboring sample may be represented by a value which is derived by several surrounding samples of the neighboring sample, such as the weighted average of surrounding samples.

In another example, the neighboring samples may be selected from a given picture region (search window) using a template matching process. To identify these samples, for each pixel or selected set of pixels in the given picture region, its surrounding samples are compared to the surrounding samples of current pixel, and those pixels with similar (smaller difference) surrounding samples as compared to the current sample are selected as the neighboring samples. For example, in FIG. 4, the neighboring samples of $s_0$ and $s_x$ are compared to the current pixel X, as $$SAD_0 = \sum_{i=0}^{7} |D_0^i - C_i|$$

$$SAD_x = \sum_{i=0}^{7} |D_x^i - C_i|$$

Based on the SAD values, N (e.g., 4 or 8) samples with least SAD values (e.g., $s_0$) are then identified and used as the neighboring samples.

Figure 4:
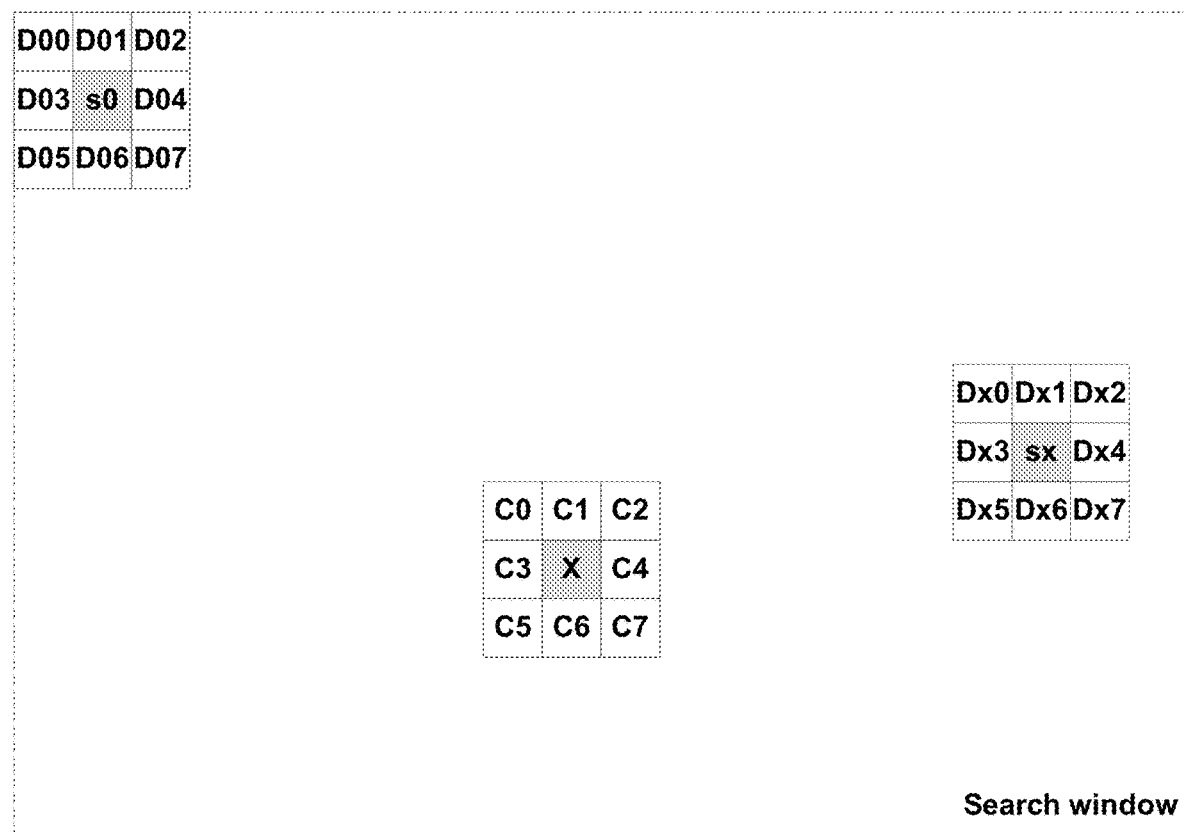
FIG. 4 shows an example of a current pixel and neighboring pixels of the current pixel.

According to the techniques of this disclosure, to determine offsets for a first sample and a second sample, video encoder 20 and video decoder 30 may compare a first sample of a current block to a first set of neighbor samples and compare a second sample of the current block to a second set of neighbor samples, with the the first set of neighbor samples having a same pattern relative to the first sample as the second set of neighbor samples has relative to the second sample. Referring to FIG. 4, pixels C1, C3, C4, and C6 have the same pattern relative to pixel X as pixels DX1, DX3, DX4, and DX6 have relative to pixel SX. As another example, pixels C2 and C5 have the same pattern relative to pixel X as pixels DX2-DX5 have relative to pixel SX. As another example, pixels C1-C8 have the same pattern relative to pixel X as pixels DX1-DX8 have relative to pixel SX.

In one example, N may be set to 4 or 8. In another example, different type determination may utilize different number of neighboring samples. In another example, even within one type, different groups may use different neighboring samples, e.g., N may be different. In another example, even within one group, different classes may use different neighboring samples, e.g., N may be different.

Figure 5:
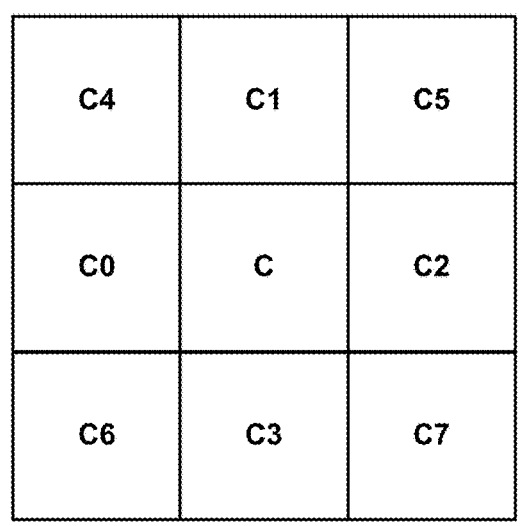
FIG. 5 shows an example of a current pixel and neighboring pixels of the current pixel.

The relative positions of which neighboring samples are utilized may be pre-defined and fixed for each type. For example, for N equal to 4, the relative positions are: left, top, right and bottom, as shown in FIG. 5 (denoted by $C_i$ with i being 0..3) while for N equal to 8, the spatial surrounding samples are utilized. In other examples, the positions of neighboring samples for a type may be adaptive within a slice, e.g., it may depend on intra prediction mode/transform matrix/slice type. In other examples, indications of the relative positions may be signaled in sequence parameter set/picture parameter set/slice header/adaption parameter set.

FIG. 5 shows an example of neighboring samples $C_i$ and current sample C. In another example, the relative positions of which neighboring samples utilized to determine the type, group and/or classes are not limited to the examples as shown in FIG. 5. The relative positions can be any pre-defined spatial and/or temporal neighboring samples.

Video encoder 20 may signal to video decoder 30 an indication of how many neighboring samples are used for filtering. In another example, an indication of maximum number of how many neighboring samples are used for filtering may be signaled. In another example, furthermore, an indication of how many groups within a type may be further signaled. In another example, an index of type may be signaled which may imply both the number (and/or positions of neighboring samples) as well as a group number within the type denoted by K. In this case, there is no need to signal the group numbers separately. In one example, the relationship among type index, N and K is given below in Table II.

TABLE II

| Index of Type | N (number of neighboring samples for filter parameter selection) | K (number of groups for a given type index) |
| --- | --- | --- |
| 1 | 4 | 1 |
| 2 | 4 | 2 |
| 3 | 8 | 4 |
| 4 | 4 or 8 | 5 |

Aspects of group definition will now be described. For example, denote the number of neighboring samples (or representative neighboring sample) with larger value than current sample by $C_{lgr}(N)$, the number of neighboring samples with smaller value than current sample by $C_{sml}(N)$. The criteria for group definition may be dependent on the value of $C_{lgr}(N)$ and/or $C_{sml}(N)$.

In another example, it may be dependent on a function $f(C_{lgr}(N), C_{sml}(N))$, e.g., $f$ is defined as maximum function. When $C_{lgr}(N)$ is larger than $C_{sml}(N)$, it is named as 'large trend'. When $C_{lgr}(N)$ is smaller than $C_{sml}(N)$, it is named as 'small trend'. For two samples located at different positions, if one belongs to the large trend and the other belongs to the small trend, but the returned values of the function are the same (an example is shown in FIGS. 6A and 6B and described below), the following may apply. In one example, the two samples may be classified to be within the same group. In this case, furthermore, if the class indexes are the same, symmetric filtering process is applied to the two trends wherein the offset is the same while for the large trend, modified sample value is set to the original value plus the offset, and for the small trend, modified sample value is set to the original value minus the offset. In another example, the two samples may be classified into two groups/classes and each group/class may have different offsets. In this case, the filtering process is asymmetric.

FIGS. 6A and 6B show examples of two samples with 8-selected neighboring samples. FIG. 6A shows an example of 'large trend' with current sample value equal to 50 and $C_{lgr}(N)=6$. FIG. 6B shows an example of 'small trend' with current sample value equal to 93 and $C_{sml}(N)=6$.

In one example, depending on the total number of groups K, several thresholds ($T_0, T_1, \ldots T_K$ in ascending order) may be pre-defined. In other examples, the thresholds may be signaled or derived on-the-fly. The group index may be derived by comparing the value of $C_{lgr}(N)$, $C_{sml}(N)$ to the threshold value.

The samples which satisfy one of the following conditions, it will be classified to i-th group:

ƒ(•) is larger than $T_i$ and ƒ(•) is no larger than $T_{i+1}$

On the contrary, if ƒ(•) is smaller than or equal to $T_0$, the sample is not classified, that is, no filtering operation will be applied to this sample.

In one example, the thresholds are defined as shown below in Table III.

TABLE III

| Index of Type | N (number of neighboring samples for filter parameter selection) | K (number of groups for a given type index) | Thresholds |
|---|---|---|---|
| 1 | 4 | 1 | $T_0 = 2, T_1 = 4$ |
| 2 | 4 | 2 | $T_0 = 2, T_1 = 3, T_2 = 4$ |
| 3 | 8 | 4 | $T_0 = 4, T_1 = 5, T_2 = 6, T_3 = 7, T_4 = 8$ |
| 4 | 4 or 8 | 5 | |

In one example, furthermore, the group determination may depend on the (small/large) trend for different Ns. In one example, for two different Ns, if the trends are different, different thresholds may be utilized. In another example, it may further depend on the f(•). An example for type equal to 4 is given as shown below in Table IV.

TABLE IV

| Type | K | Thresholds |
|---|---|---|
| 4 | 5 | Group 0:<br>!(f($C_{lgr}(4)$, $C_{sml}(4)$) > M && sign($C_{lgr}(4)$-$C_{sml}(4)$)== sign($C_{lgr}(8)$-$C_{sml}(8)$))<br>&& f($C_{lgr}(8)$, $C_{sml}(8)$) > $T_0$ && f($C_{lgr}(8)$, $C_{sml}(8)$) <= $T_1$<br>In one example, $T_0 = 4, T_1 = 7$;<br>i-th Group (with i being 1 . . . 4):<br>f($C_{lgr}(4)$, $C_{sml}(4)$) > M && sign($C_{lgr}(4)$-$C_{sml}(4)$)== sign($C_{lgr}(8)$-$C_{sml}(8)$)<br>&& f($C_{lgr}(8)$, $C_{sml}(8)$) > $T_i$ && f($C_{lgr}(8)$, $C_{sml}(8)$) <= $T_{i+1}$<br>In one example, $T_1 = 4, T_2 = 5, T_3 = 6, T_4 = 7, T_5 = 8$ |

In another example, for type equal to 4, there may be 6 groups and the definitions of each group may be defined as shown below in Table V.

TABLE V

| Type | K | Thresholds |
|---|---|---|
| 4 | 6 | i-th Group (with i being 0/1):<br>!(f($C_{lgr}(4)$, $C_{sml}(4)$) > M && sign($C_{lgr}(4)$-$C_{sml}(4)$)== sign($C_{lgr}(8)$-$C_{sml}(8)$))<br>&& f($C_{lgr}(8)$, $C_{sml}(8)$) > $T_i$ && f($C_{lgr}(8)$, $C_{sml}(8)$) <= $T_{i+1}$<br>In one example, $T_0 = 4, T_1 = 5, T_2 = 8$; |

TABLE V-continued

| Type | K | Thresholds |
|---|---|---|
| | | i-th Group (with i being 2 . . . 5):<br>f($C_{lgr}(4)$, $C_{sml}(4)$) > M && sign($C_{lgr}(4)$-$C_{sml}(4)$)== sign($C_{lgr}(8)$-$C_{sml}(8)$)<br>&& f($C_{lgr}(8)$, $C_{sml}(8)$) > $T_i$ && f($C_{lgr}(8)$, $C_{sml}(8)$) <= $T_{i+1}$<br>In one example, $T_2 = 4, T_3 = 5, T_4 = 6, T_5 = 7, T_6 = 8$ |

In another example, the information of how many neighboring samples are equal to current sample may be taken into consideration for group determination. In another example, furthermore, the group determination may depend on CBF (coded block flag, to indicate all zero coefficients)/coded mode (intra/inter)/transform matrix/prediction direction (uni-prediction or bi-prediction)/prediction block/temporal level of current slice.

In one example, when multiple values of N are allowed for a certain type, as described above with respect to Tables III and IV where N may be either 4 or 8 for type 4, one or more indices may be signaled to tell which N should be used for a group within the type.

Video encoder 20 and video decoder 30 may associate a class index with an offset value. Criteria for class index determination will now be discussed. Determination of class indices may depend on the average value of differences between selected neighboring samples and current sample. In one example, the number of selected neighboring samples may not be larger than the total number of neighboring samples used for type definition, e.g., N mentioned above. In one example, the selected neighboring samples should be larger (or smaller) than current sample when it is a 'large (or small) trend'. Denote the selected samples are $C_{s0}, C_{s1}, \ldots, C_{sM-1}$, the class index is derived as $$\left(\sum_{m=0}^{m=M-1} (|C_{sm} - C|)\right) / M.$$

M is a non-zero positive number. In another example, furthermore, the samples with the largest and smallest differences among all the selected samples are further removed, i.e., not considered in determination of class index. In another example, the number of selected samples shall be equal to (pow (2, x)) so that the division operation could be replaced by shift. In another example, only one sample may be selected.

In another example, class index may depend on the summation of value differences between selected neighboring samples and current sample. In another example, furthermore, class index may depend on a normalization factor. In one example, the class index is derived as:

$$\left(\sum_{m=0}^{m=M-1} (|C_{sm} - C|)\right) / M / NF$$

wherein NF denotes the normalization factor. In another example, the normalization factor may be equal to (pow (2, x)), and thus the class index may be derived as:

$$\left(\frac{\sum_{m=0}^{m=M-1}(|C_{sm}-C|))/M}{(1 \ll NF)}\right)$$

In one example, the normalization factor may depend on the type index/group index/N. The normalization factor may be signaled for each group. In other examples, all groups may share the same normalization factor wherein a flag may be signaled to indicate whether normalization factor is share or not.

A maximum number of allowed classes may be signaled. In one example, this number is shared by all types/groups. In one example, this number may be signaled or implicated derived on-the-fly. In another example, furthermore, when the derived class index exceeds the maximum number of allowed classes, these samples are merged together. In one example, the class index is derived as:

$$\min(\max Nr - IdxOffset, \left(\frac{\sum_{m=0}^{m=M-1}(|C_{sm}-C|))/M}{(1 \ll NF)}\right))$$

or $$\min\left(\max Nr - IdxOffset, \left(\sum_{m=0}^{m=M-1}(|C_{sm}-C|)\right) \gg NF\right)$$

wherein IdxOffset may be equal to 0 or 1.

Video encoder 20 may signal to video decoder 30 offset values. Signaling of offset values in peak SAO will now be discussed. For the large trend and small trend, the corresponding positive and negative offset may share the same magnitude. In other examples, different offset values may be signaled. Offsets may be coded with bypass coding. In other examples, offsets may be coded with context models. Unary/truncated unary/fixed-length binarization method may be used to code magnitude of the offset. Video encoder 20 and video decoder 30 may utilize predictive coding by coding the difference between one offset and its previously coded value (associated with a neighboring class index) in the same group. Furthermore, one flag to indicate whether this method is enabled or not. Predictive coding may be utilized by coding the difference between one offset and its previously coded value (associated with a selected class index) in a different group. In one example, the offsets may be inherited or predicted from offset values used in previously coded slices. In one example, several sets of offset values may be stored. One index of the set may be further signaled. In one example, the offsets may be derived on-the-fly without signaling. In one example, the average of selected neighboring samples may be firstly calculated. The offset may be set min(average, Thresh) wherein the variable Thresh may be pre-defined. For high bit-depth input, a fixed shift value may be pre-defined or signaled in SPS/PPS/APS/slice header, denoted by L. In this case, the final offset is set equal to (the signaled/derived offset>>L).

Aspect of how video encoder 20 and video decoder 30 may apply peak SAO will now be discussed. In one example, the proposed peak SAO method may be only applied to luma component. In other examples, furthermore, one flag may be signaled to indicate whether peak SAO is enabled or disabled for the luma component in a certain picture/slice/tile. In another example, the proposed peak SAO method may be applied to all color components. In one example, it may be invoked or disabled for all three color components. Furthermore, one flag may be signaled to indicate whether peak SAO is enabled or disabled for all three color components in a certain picture/slice/tile/block. In another example, each color component may have its own control of enabling/disabling peak SAO. Furthermore, one flag for each component may be signaled to indicate whether peak SAO is enabled or disabled for the component in a certain picture/slice/tile/block. In another example, separate controls for luma and chroma components may be used. Furthermore, one flag for the luma component and one flag for two chroma components may be signaled to indicate whether peak SAO is enabled or disabled for the component in a certain picture/slice/tile/block. In above cases, the signaling of the indications of enabling peak SAO for one/more chroma components may be dependent on that for luma component. In one example, only when the peak SAO is applied to the luma component of one picture/slice/tile/block, indications for chroma components may be signaled. Otherwise, peak SAO won't be applied to chroma components.

In one example, for certain color component, video encoder 20 may encode, and video decoder 30 may decode, on/off flags to indicate whether peak SAO is applied or not for each coding block tree/coding unit/region.

Usage of peak SAO in video coding systems, such as system 10 described above, will now be described. The described techniques may be used as post-processing, i.e., out-loop of the video coding system. In another example, the proposed method may be used as one separate in-loop filtering coding tool. In one example, it may be invoked before all the other filtering coding tools, such as DBF, SAO, adaptive loop filter (ALF). In another example, it may be invoked among the filtering coding tools, such as after DB and before SAO, or after SAO but before ALF. In another example, it may be invoked after all filtering coding tools, such as after ALF. In another example, peak SAO may be applied to a prediction block of one block, e.g., the prediction block is the motion-compensated block or derived from intra prediction.

In another example, video encoder 20 and video decoder 30 may implement the peak SAO techniques of this disclosure jointly with the other in-loop filtering coding tool(s), including the HEVC version of SAO or other version of SAO. In another example, furthermore, the inputs for peak SAO and the jointly used in-loop filtering tool (e.g., SAO) will be the same. In another example, furthermore, the type of SAO or types of EO would be extended to cover the usage of peak SAO.

Techniques related to SAO will now be described. For two categories which are defined with opposite conditions, the magnitudes of two offsets (e.g., one positive and one negative) are forced to be the same. Therefore, only one offset may need to be signaled instead of two. In one example, positive offsets for EO category 1 and negative offsets for EO category 4 is forced to be the same. In one example, positive offsets for EO category 2 and negative offsets for EO category 3 is forced to be the same.

For two categories which are defined with opposite conditions, video encoder 20 and video decoder 30 may predictively code the magnitude of the second offset (positive or negative). Therefore, only the difference of the two magnitudes may be coded for the second offset. In another example, instead of only allowing the merge of SAO parameters from the spatial left or above CTU, it is proposed that the parameters of current block could be inherited from other neighboring blocks, such as top-left, top-right block. In another example, furthermore, the parameters of one block could be copied from a block which is not a neighboring block. In another example, the parameters of one block could be copied from a block which is located in a different picture.

The techniques described herein may achieve memory bandwidth savings. When multiple in-loop filtering methods may be applied, the input of at least two in-loop filtering methods may be the same. That is, the classification is based on the same input for two or more filtering methods. In one example, the reconstructed image after invoking DBF may be used as the input for both peak SAO and SAO. In one example, the reconstructed image after invoking peak SAO may be used as the input for both SAO and ALF/GALF. In another example, furthermore, the filtering processes of different filtering methods may still be performed according to a certain order.

Figure 7:
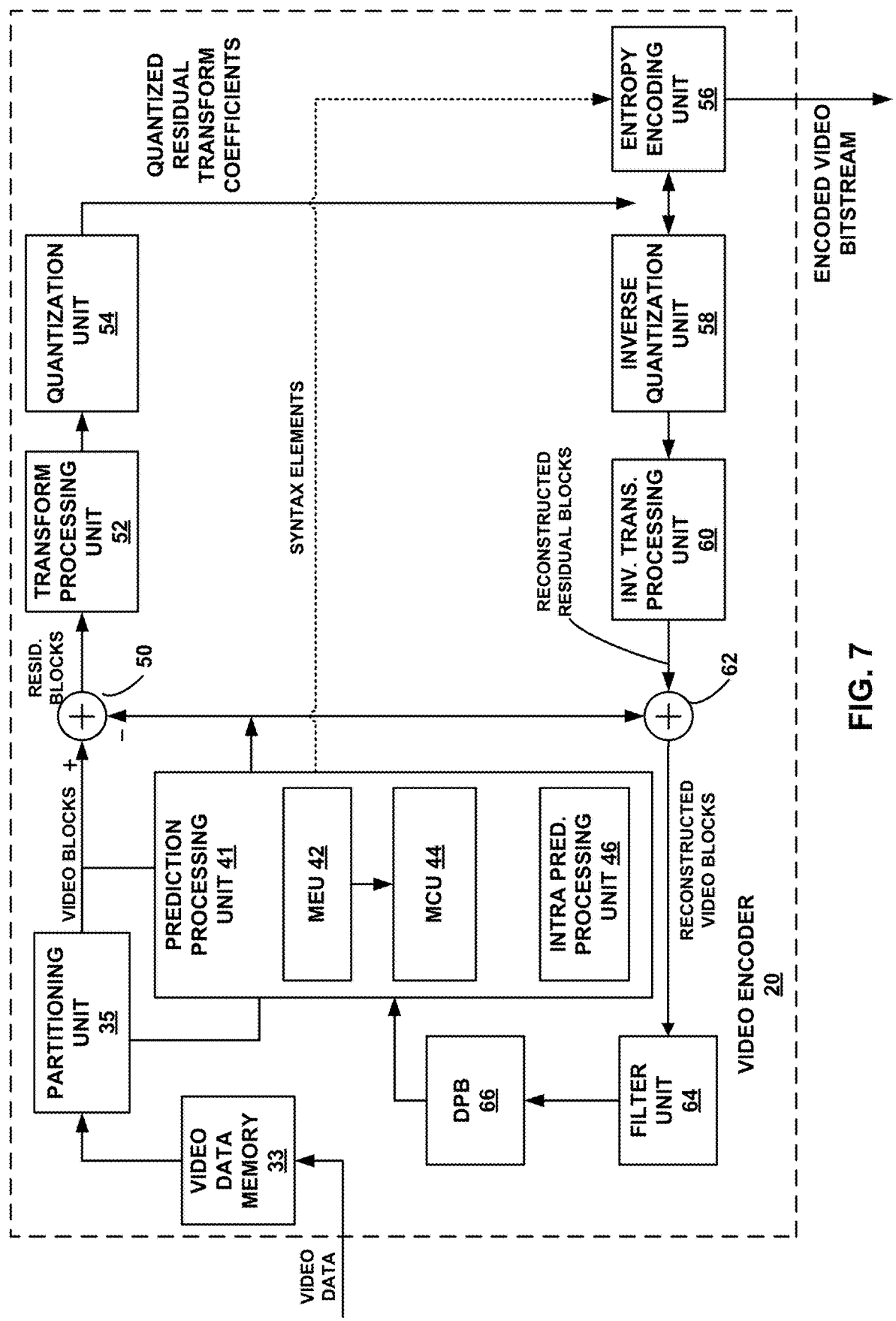
FIG. 7 is a block diagram illustrating an example video encoder that may implement the techniques described in this disclosure.

FIG. 7 is a block diagram illustrating an example video encoder 20 that may implement the techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 7, video encoder 20 includes a video data memory 33, partitioning unit 35, prediction processing unit 41, summer 50, transform processing unit 52, quantization unit 54, entropy encoding unit 56. Prediction processing unit 41 includes motion estimation unit (MEU) 42, motion compensation unit (MCU) 44, and intra prediction unit 46. For video block reconstruction, video encoder 20 also includes inverse quantization unit 58, inverse transform processing unit 60, summer 62, filter unit 64, and decoded picture buffer (DPB) 66.

As shown in FIG. 7, video encoder 20 receives video data and stores the received video data in video data memory 33. Video data memory 33 may store video data to be encoded by the components of video encoder 20. The video data stored in video data memory 33 may be obtained, for example, from video source 18. DPB 66 may be a reference picture memory that stores reference video data for use in encoding video data by video encoder 20, e.g., in intra- or inter-coding modes. Video data memory 33 and DPB 66 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 33 and DPB 66 may be provided by the same memory device or separate memory devices. In various examples, video data memory 33 may be on-chip with other components of video encoder 20, or off-chip relative to those components.

Partitioning unit 35 retrieves the video data from video data memory 33 and partitions the video data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra prediction unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices or B slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in DPB 66. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in DPB 66. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components.

Summer 50 represents the component or components that perform this subtraction operation. Motion compensation unit 44 may also generate syntax elements associated with the video blocks and the video slice for use by video decoder 30 in decoding the video blocks of the video slice.

After prediction processing unit 41 generates the predictive block for the current video block, either via intra prediction or inter prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. In another example, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed block.

Filter unit 64 filters the reconstructed block (e.g. the output of summer 62) and stores the filtered reconstructed block in DPB 66 for uses as a reference block. The reference block may be used by motion estimation unit 42 and motion compensation unit 44 as a reference block to inter-predict a block in a subsequent video frame or picture. Filter unit 64 may perform any type of filtering such as deblock filtering, SAO filtering, peak SAO filtering, ALF, and/or GALF, and/or other types of loop filters. A deblock filter may, for example, apply deblocking filtering to filter block boundaries to remove blockiness artifacts from reconstructed video. A peak SAO filter may apply offsets to reconstructed pixel values in order to improve overall coding quality. Additional loop filters (in loop or post loop) may also be used.

Figure 8:
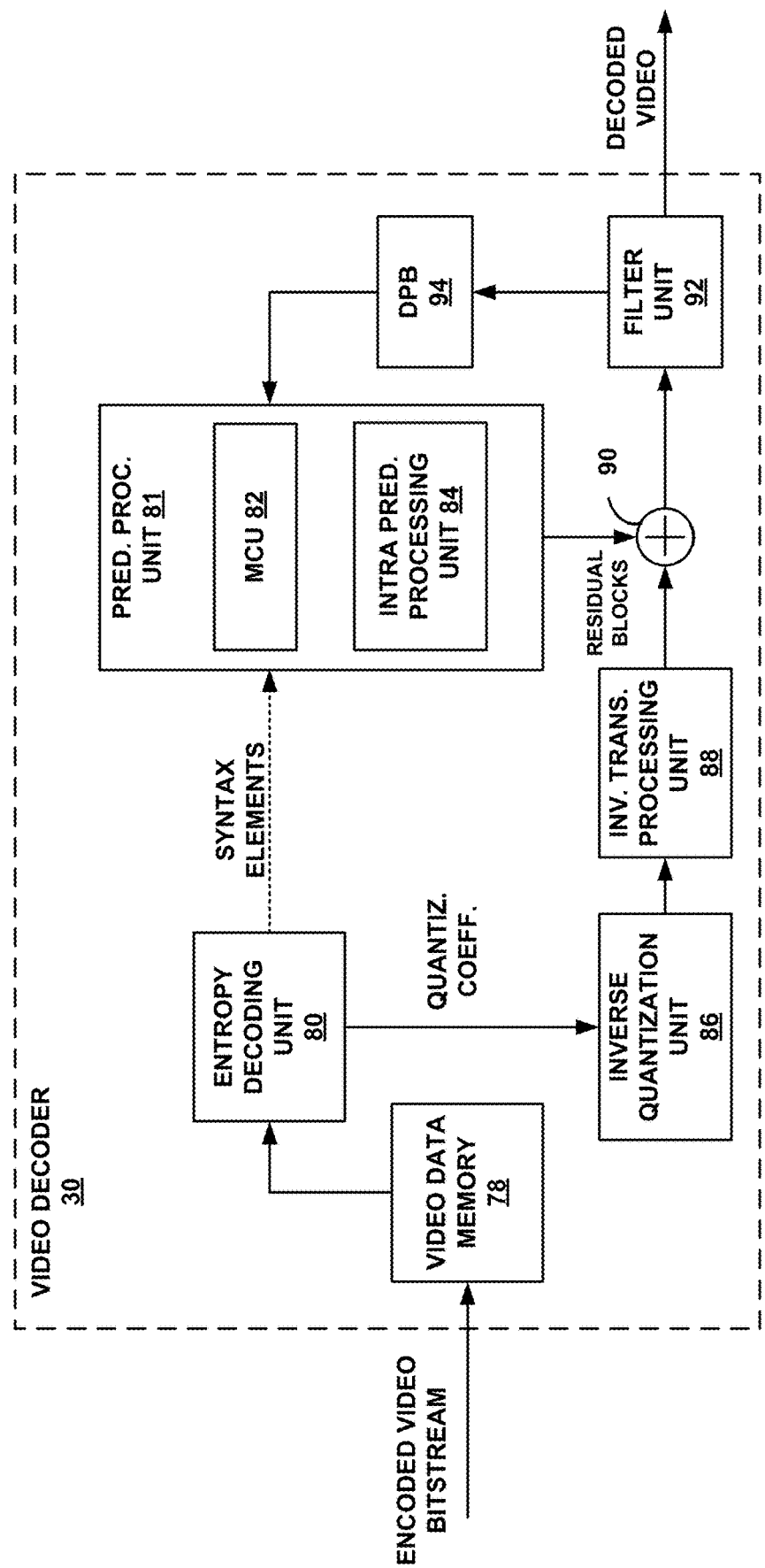
FIG. 8 is a block diagram illustrating an example video decoder that may implement the techniques described in this disclosure.

FIG. 8 is a block diagram illustrating an example video decoder 30 that may implement the techniques described in this disclosure. Video decoder 30 of FIG. 8 may, for example, be configured to receive the signaling described above with respect to video encoder 20 of FIG. 7. In the example of FIG. 8, video decoder 30 includes video data memory 78, entropy decoding unit 80, prediction processing unit 81, inverse quantization unit 86, inverse transform processing unit 88, summer 90, and DPB 94. Prediction processing unit 81 includes motion compensation unit 82 and intra prediction unit 84. Video decoder 30 may, in some examples, perform a decoding pass generally reciprocal to the encoding pass described with respect to video encoder 20 from FIG. 7.

During the decoding process, video decoder 30 receives an encoded video bitstream that represents video blocks of an encoded video slice and associated syntax elements from video encoder 20. Video decoder 30 stores the received encoded video bitstream in video data memory 78. Video data memory 78 may store video data, such as an encoded video bitstream, to be decoded by the components of video decoder 30. The video data stored in video data memory 78 may be obtained, for example, via link 16, from storage device 26, or from a local video source, such as a camera, or by accessing physical data storage media. Video data memory 78 may form a coded picture buffer (CPB) that stores encoded video data from an encoded video bitstream. DPB 94 may be a reference picture memory that stores reference video data for use in decoding video data by video decoder 30, e.g., in intra- or inter-coding modes. Video data memory 78 and DPB 94 may be formed by any of a variety of memory devices, such as DRAM, SDRAM, MRAM, RRAM, or other types of memory devices. Video data memory 78 and DPB 94 may be provided by the same memory device or separate memory devices. In various examples, video data memory 78 may be on-chip with other components of video decoder 30, or off-chip relative to those components.

Entropy decoding unit 80 of video decoder 30 entropy decodes the video data stored in video data memory 78 to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction unit 84 of prediction processing unit 81 may generate prediction data for a video block of the current video slice based on a signaled intra prediction mode and data from previously decoded blocks of the current frame or picture. When the video frame is coded as an inter-coded slice (e.g., B slice or P slice), motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in DPB 94.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After prediction processing unit generates the predictive block for the current video block using, for example, intra or inter prediction, video decoder 30 forms a reconstructed video block by summing the residual blocks from inverse transform processing unit 88 with the corresponding predictive blocks generated by motion compensation unit 82. Summer 90 represents the component or components that perform this summation operation.

Filter unit 92 filters the reconstructed block (e.g. the output of summer 90) and stores the filtered reconstructed block in DPB 94 for uses as a reference block. The reference block may be used by motion compensation unit 82 as a reference block to inter-predict a block in a subsequent video frame or picture. Filter unit 92 may perform any type of filtering such as deblock filtering, SAO filtering, peak SAO filtering, ALF, and/or GALF, and/or other types of loop filters. A deblock filter may, for example, apply deblocking filtering to filter block boundaries to remove blockiness artifacts from reconstructed video. A peak SAO filter may apply offsets to reconstructed pixel values in order to improve overall coding quality. Additional loop filters (in loop or post loop) may also be used.

Figure 9:
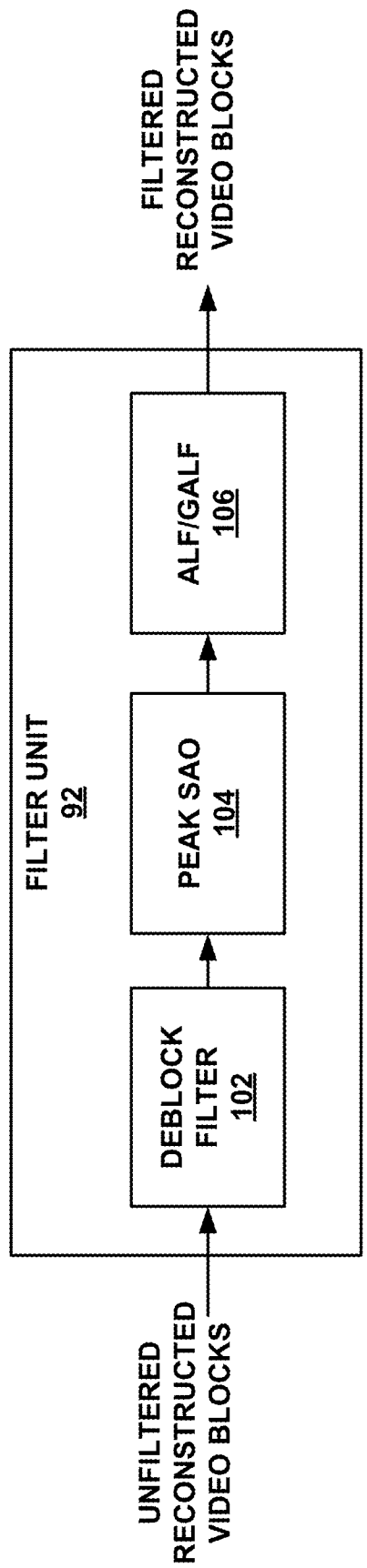
FIG. 9 shows an example implementation of a filter unit for performing the techniques of this disclosure.

FIG. 9 shows an example implementation of filter unit 92. Filter unit 64 may be implemented in the same manner. Filter units 64 and 92 may perform the techniques of this disclosure, possibly in conjunction with other components of video encoder 20 or video decoder 30. In the example of FIG. 9, filter unit 92 includes deblock filter 102, peak SAO filter 104, and ALF/GLAF filter 106. Peak SAO filter 104 may, for example, be configured to determine offset values for samples of a block in the manner described in this disclosure.

Filter unit 92 may include fewer filters and/or may include additional filters. Additionally, the particular filters shown in FIG. 9 may be implemented in a different order. Other loop filters (either in the coding loop or after the coding loop) may also be used to smooth pixel transitions or otherwise improve the video quality. The decoded video blocks in a given frame or picture are then stored in DPB 94, which stores reference pictures used for subsequent motion compensation. DPB 94 may be part of or separate from additional memory that stores decoded video for later presentation on a display device, such as display device 32 of FIG. 1.

Figure 10:
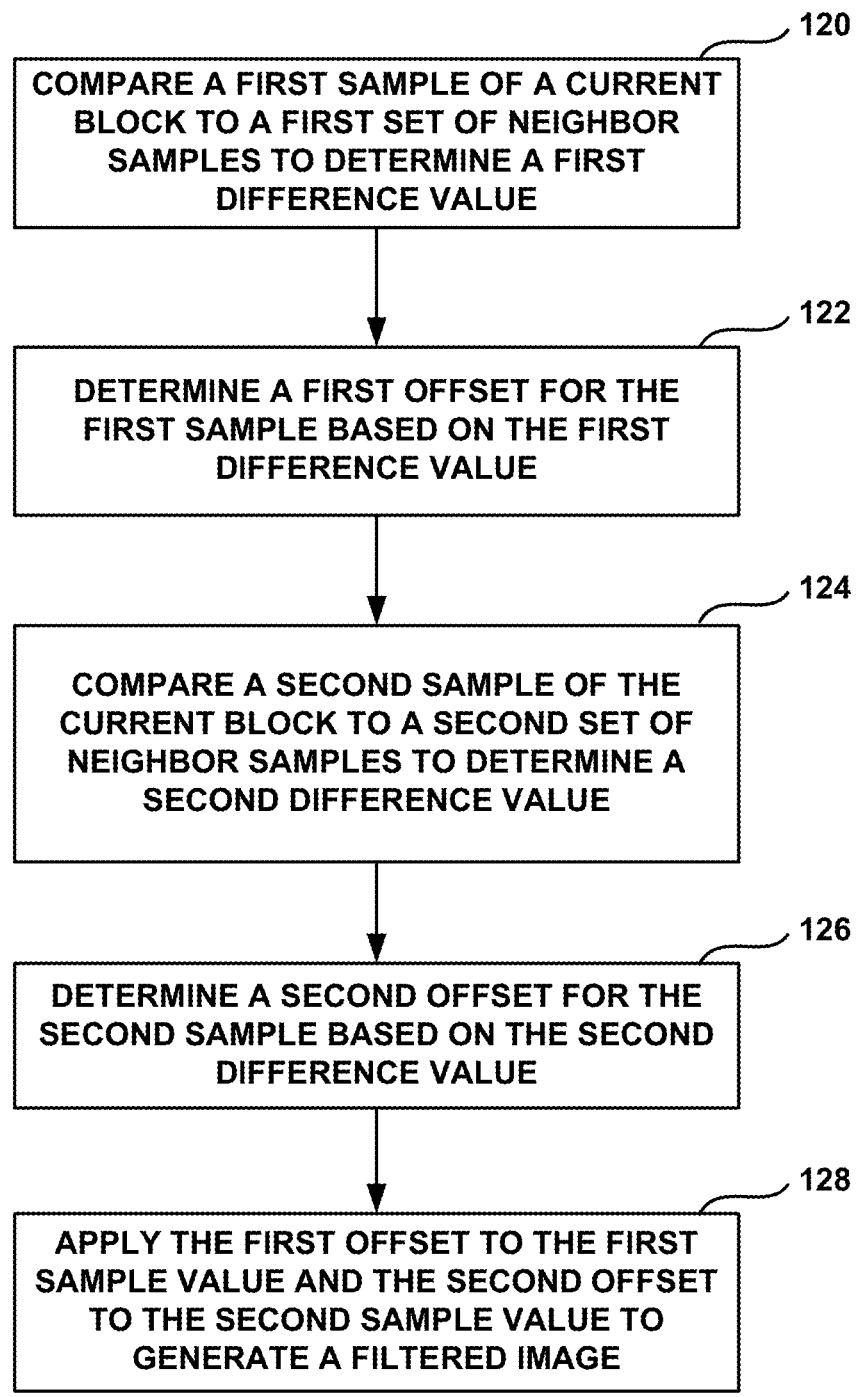
FIG. 10 is a flow diagram illustrating an example video decoding process in accordance with the techniques of this disclosure.

FIG. 10 is a flow diagram illustrating an example video decoding technique described in this disclosure. The techniques of FIG. 10 will be described with reference to a generic video decoder, such as but not limited to video decoder 30. In some instances, the techniques of FIG. 10 may be performed by the decoding loop of video encoder 20.

In the example of FIG. 10, the video decoder compares a first sample of a current block to a first set of neighbor samples to determine a first difference value (120). The first difference value may be a difference between the first sample and the first set of neighbor samples. For the current block of video data, the video decoder may receive syntax data indicating locations of neighboring samples, with the locations of the neighboring samples defining the pattern. The video decoder may receive such syntax indicating the locations of neighboring samples at, for example, a slice level, or at other levels, either below or above the slice level. In one example implementation, the syntax data indicating locations of neighboring samples includes an index value, and the video decoder maps the index value to a set of locations of neighboring samples.

The video coder may, for example, compare the first sample of the current block to the first set of neighbor samples to determine the first difference value by comparing a value of the first sample of the current block to an average value of the first set of neighbor samples, comparing a value of the first sample of the current block to a weighted average value of the first set of neighbor samples, determining a summation of value differences between a value of the first sample of the current block and sample values of the first set of neighbor samples, or by some other type of comparison.

The video decoder determines a first offset for the first sample based on the first difference value (122). The video decoder compares a second sample of the current block to a second set of neighbor samples to determine a second difference value (124). Similar to the first sample, for the second sample, the video coder may compare the second sample of the current block to the second set of neighbor samples to determine the second difference value by comparing a value of the second sample of the current block to an average value of the second set of neighbor samples, comparing a value of the second sample of the current block to a weighted average value of the second set of neighbor samples, determining a summation of value differences between a value of the second sample of the current block and sample values of the second set of neighbor samples, or by some other type of comparison. The second difference value is a difference between the second sample and the second set of neighbor samples, and the first difference value and the second difference value have a same sign (e.g., both are positive or both are negative). The first set of neighbor samples has a same pattern relative to the first sample as the second set of neighbor samples has relative to the second sample. The first set of neighbor samples and the second set of neighbor samples may each include more than two samples, and the first set of neighbor samples and the second set of neighbor samples may also each include at least one temporal neighboring samples.

The video decoder determines a second offset for the second sample based on the second difference value (126). The first offset and the second offset are both different, non-zero values. The video decoder applies the first offset to the first sample value and the second offset to the second sample value to generate a filtered image (128). For the current block of video data, the video decoder may receive syntax data indicating a set of rules for grouping samples of the current block into at least two groups. A first group may for example include samples that are to be filtered, and a second group may include samples that are not to be filtered.

In the example of FIG. 10, a value of the first sample may be greater than (or less than) all values of samples in the first set of neighbor samples, and a value of the second sample may also be greater than (or less than) all values of samples in the second set of neighbor samples. Nevertheless, despite the first sample and the second sample sharing this characteristic, the video decoder adds different offsets to the first sample and the second sample based on, for example, the magnitude of the differences. As one example, the value of the first sample may be much greater than (or much less than) all values of samples in the first set of neighbor samples, while the value of the second sample is only slight greater than (or slightly less than) all values of samples in the second set of neighbor samples. Based on this difference, the video decoder may apply different offsets to the first sample and the second sample.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for decoding video data, the method comprising:
   comparing a first sample of a current block to a first set of neighbor samples to determine a first difference value;
   determining a number of samples in the first set of neighbor samples that have larger values than the first sample;
   determining a number of samples in the first set of neighbor samples that have smaller values than the first samples;
   in response to the number of samples in the first set of neighbor samples that have larger values than the first sample being greater than the number of samples in the first set of neighbor samples that have smaller values than the first samples, assigning the first sample to a first group;
   determining a first offset for the first sample, from a set of offset values for the first group, based on the first difference value, wherein the first offset is a first non-zero value;
   comparing a second sample of the current block to a second set of neighbor samples to determine a second difference value, wherein the first set of neighbor samples has a same pattern relative to the first sample as the second set of neighbor samples has relative to the second sample, and wherein the first difference value and the second difference value have a same sign;
   determining a number of samples in the second set of neighbor samples that have larger values than the second sample;
   determining a number of samples in the second set of neighbor samples that have smaller values than the second samples;

in response to the number of samples in the second set of neighbor samples that have larger values than the second sample being greater than the number of samples in the second set of neighbor samples that have smaller values than the second samples, assigning the second sample to a second group;

determining a second offset for the second sample, from a set of offset values for the second group, based on the second difference value, wherein the second offset is a second non-zero value that is different than the first non-zero value; and applying the first offset to the first sample value and the second offset to the second sample value to generate a filtered image.

2. The method of claim 1, wherein the first set of neighbor samples and the second set of neighbor samples each include eight samples.

3. The method of claim 1, wherein the first set of neighbor samples and the second set of neighbor samples each include at least one temporal neighboring sample that is in a different picture than a current picture that includes the current block.

4. The method of claim 1, further comprising:
for the current block of video data, receiving syntax data indicating locations of neighboring samples, wherein the locations of the neighboring samples define the pattern; and
determining the first set of neighbor samples and the second set of neighbor samples based on the received syntax data indicating the locations of the neighboring samples.

5. The method of claim 1, further comprising
for the current block of video data, receiving syntax data indicating a set of rules for grouping samples of the current block into at least two groups, wherein a first group comprises samples that are to be filtered and a second group comprises samples that are not to be filtered; and
determining that the first sample and the second sample belong to the first group.

6. The method of claim 1, wherein comparing the first sample of the current block to the first set of neighbor samples to determine the first difference value comprises comparing a value of the first sample of the current block to an average value of the first set of neighbor samples.

7. The method of claim 1, wherein comparing the first sample of the current block to the first set of neighbor samples to determine the first difference value comprises determining a summation of value differences between a value of the first sample of the current block and sample values of the first set of neighbor samples.

8. The method of claim 1, wherein a value of the first sample is greater than all values of samples in the first set of neighbor samples and a value of the second sample is greater than all values of samples in the second set of neighbor samples.

9. The method of claim 1, wherein the method is performed as part of a video encoding process.

10. A device for decoding video data, the device comprising:
a memory configured to store the video data; and
one or more processors configured to:
compare a first sample of a current block to a first set of neighbor samples to determine a first difference value;
determine a number of samples in the first set of neighbor samples that have larger values than the first sample;
determine a number of samples in the first set of neighbor samples that have smaller values than the first samples;
in response to the number of samples in the first set of neighbor samples that have larger values than the first sample being greater than the number of samples in the first set of neighbor samples that have smaller values than the first samples, assign the first sample to a first group;
determine a first offset for the first sample, from a set of offset values for the first group, based on the first difference value, wherein the first offset is a first non-zero value;
compare a second sample of the current block to a second set of neighbor samples to determine a second difference value, wherein the first set of neighbor samples has a same pattern relative to the first sample as the second set of neighbor samples has relative to the second sample, and wherein the first difference value and the second difference value have a same sign;
determine a number of samples in the second set of neighbor samples that have larger values than the second sample;
determine a number of samples in the second set of neighbor samples that have smaller values than the second samples;
in response to the number of samples in the second set of neighbor samples that have larger values than the second sample being greater than the number of samples in the second set of neighbor samples that have smaller values than the second samples, assign the second sample to a second group;
determine a second offset for the second sample, from a set of offset values for the second group, based on the second difference value, wherein the second offset is a second non-zero value that is different than the first non-zero value; and
apply the first offset to the first sample value and the second offset to the second sample value to generate a filtered image.

11. The device of claim 10, wherein the first set of neighbor samples and the second set of neighbor samples each include eight samples.

12. The device of claim 10, wherein the first set of neighbor samples and the second set of neighbor samples each include at least one temporal neighboring sample that is in a different picture than a current picture that includes the current block.

13. The device of claim 10, wherein the one or more processors are further configured to:
for the current block of video data, receive syntax data indicating locations of neighboring samples, wherein the locations of the neighboring samples define the pattern; and
determine the first set of neighbor samples and the second set of neighbor samples based on the received syntax data indicating the locations of the neighboring samples.

14. The device of claim 10, wherein the one or more processors are further configured to:
for the current block of video data, receive syntax data indicating a set of rules for grouping samples of the current block into at least two groups, wherein a first group comprises samples that are to be filtered and a second group comprises samples that are not to be filtered; and determine that the first sample and the second sample belong to the first group.

15. The device of claim 10, wherein to compare the first sample of the current block to the first set of neighbor samples to determine the first difference value, the one or more processors are further configured to compare a value of the first sample of the current block to an average value of the first set of neighbor samples.

16. The device of claim 10, wherein to compare the first sample of the current block to the first set of neighbor samples to determine the first difference value, the one or more processors are further configured to determine a summation of value differences between a value of the first sample of the current block and sample values of the first set of neighbor samples.

17. The device of claim 10, wherein a value of the first sample is greater than all values of samples in the first set of neighbor samples and a value of the second sample is greater than all values of samples in the second set of neighbor samples.

18. The device of claim 10, wherein the device is configured to decode video data as part of a video encoding process.

19. The device of claim 10, wherein the device comprises a wireless communication device, further comprising a receiver configured to receive encoded video data.

20. The device of claim 19, wherein the wireless communication device comprises a telephone handset and wherein the receiver is configured to demodulate, according to a wireless communication standard, a signal comprising the encoded video data.

21. A computer readable medium storing instructions that when executed by one or more processors cause the one or more processors to:
    compare a first sample of a current block to a first set of neighbor samples to determine a first difference value;
    determine a number of samples in the first set of neighbor samples that have larger values than the first sample;
    determine a number of samples in the first set of neighbor samples that have smaller values than the first samples;
    in response to the number of samples in the first set of neighbor samples that have larger values than the first sample being greater than the number of samples in the first set of neighbor samples that have smaller values than the first samples, assig the first sample to a first group;
    determine a first offset for the first sample, from a set of offset values for the first group, based on the first difference value, wherein the first offset is a first non-zero value;
    compare a second sample of the current block to a second set of neighbor samples to determine a second difference value, wherein the first set of neighbor samples has a same pattern relative to the first sample as the second set of neighbor samples has relative to the second sample, and wherein the first difference value and the second difference value have a same sign;
    determine a number of samples in the second set of neighbor samples that have larger values than the second sample;
    determine a number of samples in the second set of neighbor samples that have smaller values than the second samples;
    in response to the number of samples in the second set of neighbor samples that have larger values than the second sample being greater than the number of samples in the second set of neighbor samples that have smaller values than the second samples, assign the second sample to a second group;
    determine a second offset for the second sample, from a set of offset values for the second group, based on the second difference value, wherein the second offset is a second non-zero value that is different than the first non-zero value; and
    apply the first offset to the first sample value and the second offset to the second sample value to generate a filtered image.

22. The computer readable medium of claim 21, wherein the first set of neighbor samples and the second set of neighbor samples each include eight samples.

23. The computer readable medium of claim 21, wherein the first set of neighbor samples and the second set of neighbor samples each include at least one temporal neighboring sample that is in a different picture than a current picture that includes the current block.

24. The computer readable medium of claim 21, storing further instructions that when executed cause the one or more processors to:
    for the current block of video data, receive syntax data indicating locations of neighboring samples, wherein the locations of the neighboring samples define the pattern; and
    determine the first set of neighbor samples and the second set of neighbor samples based on the received syntax data indicating the locations of the neighboring samples.

25. The computer readable medium of claim 21, storing further instructions that when executed cause the one or more processors to:
    for the current block of video data, receive syntax data indicating a set of rules for grouping samples of the current block into at least two groups, wherein a first group comprises samples that are to be filtered and a second group comprises samples that are not to be filtered; and
    determine that the first sample and the second sample belong to the first group.

26. The computer readable medium of claim 21, wherein to compares the first sample of the current block to the first set of neighbor samples to determine the first difference value, the instructions cause the one or more processors to compare a value of the first sample of the current block to an average value of the first set of neighbor samples.

27. The computer readable medium of claim 21, wherein to compare the first sample of the current block to the first set of neighbor samples to determine the first difference value, the instructions cause the one or more processors to determine a summation of value differences between a value of the first sample of the current block and sample values of the first set of neighbor samples.

28. The computer readable medium of claim 21, wherein a value of the first sample is greater than all values of samples in the first set of neighbor samples and a value of the second sample is greater than all values of samples in the second set of neighbor samples.

29. An apparatus for decoding video data, the apparatus comprising:
    means for comparing a first sample of a current block to a first set of neighbor samples to determine a first difference value;
    means for determining a number of samples in the first set of neighbor samples that have larger values than the first sample;

means for determining a number of samples in the first set of neighbor samples that have smaller values than the first samples;

means for assigning the first sample to a first group in response to the number of samples in the first set of neighbor samples that have larger values than the first sample being greater than the number of samples in the first set of neighbor samples that have smaller values than the first samples;

means for determining a first offset for the first sample, from a set of offset values for the first group, based on the first difference value, wherein the first offset is a first non-zero value;

means for comparing a second sample of the current block to a second set of neighbor samples to determine a second difference value, wherein the first set of neighbor samples has a same pattern relative to the first sample as the second set of neighbor samples has relative to the second sample, and wherein the first difference value and the second difference value have a same sign;

means for determining a number of samples in the second set of neighbor samples that have larger values than the second sample;

means for determining a number of samples in the second set of neighbor samples that have smaller values than the second samples;

means for assigning the second sample to a second group in response to the number of samples in the second set of neighbor samples that have larger values than the second sample being greater than the number of samples in the second set of neighbor samples that have smaller values than the second samples;

means for determining a second offset for the second sample, from a set of offset values for the second group, based on the second difference value, wherein the second offset is a second non-zero value that is different than the first non-zero value; and means for applying the first offset to the first sample value and the second offset to the second sample value to generate a filtered image.

30. The apparatus of claim 29, wherein the first set of neighbor samples and the second set of neighbor samples each include eight samples.

31. The apparatus of claim 29, wherein the first set of neighbor samples and the second set of neighbor samples each include at least one temporal neighboring sample that is in a different picture than a current picture that includes the current block.

32. The apparatus of claim 29, further comprising:

means for receiving syntax data for the current block of video data indicating locations of neighboring samples, wherein the locations of the neighboring samples define the pattern; and means for determining the first set of neighbor samples and the second set of neighbor samples based on the received syntax data indicating the locations of the neighboring samples.

33. The apparatus of claim 29, further comprising receiving syntax data for the current block of video data indicating a set of rules for grouping samples of the current block into at least two groups, wherein a first group comprises samples that are to be filtered and a second group comprises samples that are not to be filtered; and means for determining that the first sample and the second sample belong to the first group.

34. The apparatus of claim 29, wherein the means for comparing the first sample of the current block to the first set of neighbor samples to determine the first difference value comprises means for comparing a value of the first sample of the current block to an average value of the first set of neighbor samples.

35. The apparatus of claim 29, wherein the means for comparing the first sample of the current block to the first set of neighbor samples to determine the first difference value comprises means for determining a summation of value differences between a value of the first sample of the current block and sample values of the first set of neighbor samples.

36. The apparatus of claim 29, wherein a value of the first sample is greater than all values of samples in the first set of neighbor samples and a value of the second sample is greater than all values of samples in the second set of neighbor samples.

* * * * *